(12) United States Patent
Davis et al.

(10) Patent No.: US 7,530,420 B2
(45) Date of Patent: *May 12, 2009

(54) MODULAR VEHICLE DRIVETRAIN

(75) Inventors: Richard A. Davis, Mequon, WI (US); Eric A. Davis, Mequon, WI (US); Brian P. Davis, Mequon, WI (US)

(73) Assignee: American Off-Road Technologies, LLC, Mequon, WI (US)

( * ) Notice: Subject to any disclaimer, the term of this patent is extended or adjusted under 35 U.S.C. 154(b) by 546 days.

This patent is subject to a terminal disclaimer.

(21) Appl. No.: 11/018,704

(22) Filed: Dec. 21, 2004

(65) Prior Publication Data

US 2005/0103558 A1 May 19, 2005

Related U.S. Application Data

(63) Continuation-in-part of application No. 09/981,246, filed on Oct. 16, 2001, now Pat. No. 6,868,932, which is a continuation-in-part of application No. 09/217,264, filed on Dec. 21, 1998, now Pat. No. 6,343,669.

(51) Int. Cl.
*B60K 17/22* (2006.01)
*B60K 17/34* (2006.01)

(52) U.S. Cl. .................. 180/233; 180/292; 180/374; 180/908

(58) Field of Classification Search .......... 180/374, 180/376, 337, 383, 908, 233, 251, 28, 291, 180/292, 299, 21, 366, 382; 74/416, 417; 475/210

See application file for complete search history.

(56) References Cited

U.S. PATENT DOCUMENTS

| | | | |
|---|---|---|---|
| 1,650,045 A | * | 11/1927 | Riise ................. 267/141.2 |
| 2,891,370 A | | 6/1959 | Musgrave |
| 3,480,156 A | | 11/1969 | Pensa |
| 3,613,815 A | | 10/1971 | Meylink |
| 3,934,670 A | * | 1/1976 | Medalen ................. 180/211 |
| 3,939,720 A | | 2/1976 | Aaen et al. |
| 4,118,996 A | | 10/1978 | Eichinger |
| 4,449,606 A | | 5/1984 | Buschbom et al. |
| 4,630,719 A | | 12/1986 | McCormick |
| 4,666,015 A | | 5/1987 | Matsuda et al. |
| 4,679,682 A | | 7/1987 | Gray, Jr. et al. |
| 4,699,234 A | | 10/1987 | Shinozaki et al. |
| 4,714,126 A | | 12/1987 | Shinozaki et al. |
| 4,836,324 A | | 6/1989 | Morita et al. |
| 4,869,121 A | | 9/1989 | Meisenburg |
| 4,887,420 A | | 12/1989 | Cerny et al. |
| 4,914,894 A | | 4/1990 | Geiger |
| 4,952,181 A | | 8/1990 | Entringer et al. |
| 5,036,939 A | | 8/1991 | Johnson et al. |

(Continued)

FOREIGN PATENT DOCUMENTS

JP  5-162544  * 6/1993

*Primary Examiner*—Anne Marie Boehler
(74) *Attorney, Agent, or Firm*—Whyte Hirschboeck Dudek SC

(57) ABSTRACT

A vehicle drivetrain (110) includes an engine (122) with a vertical crankshaft (124), a first transmission (126) below the engine and driven by the crankshaft, a second transmission (128) above the first transmission and horizontally adjacent the engine and having an input driven by the first transmission and having an output providing vehicle propulsion. A module pre-assembled unit is ready for drop-in mounting to a vehicle.

18 Claims, 21 Drawing Sheets

U.S. PATENT DOCUMENTS

| | | |
|---|---|---|
| 5,678,649 A | 10/1997 | Minoura et al. |
| 5,699,872 A | 12/1997 | Miyakawa et al. |
| 5,791,431 A | 8/1998 | Asao et al. |
| 6,062,360 A | 5/2000 | Shields |
| 6,095,937 A | 8/2000 | Aaen |
| 6,182,784 B1 | 2/2001 | Pestotnik |
| 6,230,836 B1 | 5/2001 | Cowan et al. |
| 6,343,669 B2 * | 2/2002 | Davis et al. .......... 180/376 |
| 6,755,269 B1 | 6/2004 | Davis et al. |
| 6,868,932 B1 * | 3/2005 | Davis et al. .......... 180/292 |
| 2002/0152838 A1 | 10/2002 | Miguchi et al. |

* cited by examiner

MODULAR VEHICLE DRIVETRAIN

CROSS-REFERENCE TO RELATED APPLICATIONS

This application is a Continuation-in-Part of commonly owned U.S. application Ser. No. 09/981,246, filed Oct. 16, 2001, now U.S. Pat. No. 6,868,932 which is a Continuation-in-Part of Ser. No. 09/217,264, filed Dec. 21, 1998, now U.S. Pat. No. 6,343,669.

BACKGROUND AND SUMMARY

Parent Invention

The invention of the above-noted parent '669 patent relates to ATVs, all terrain vehicles, and more particularly to improvements enabling manufacturing cost advantages. ATVs are known in the art, and have grown in popularity, not only for recreational, but also for various functional purposes. An ATV has a straddle seat, and at least four oversized balloon tires, to overcome prior objections to three wheel ATVs. The ATV has a frame with front and rear suspensions respectively mounting the large tires and allowing sufficient travel to accommodate rough terrain. The parent invention provides a packaging construction providing a manufacturing cost advantage by enabling the use of a mass-produced economical industrial engine in an ATV. In the ATV configuration of the parent invention, a vertical crankshaft is used, which in turn enables usage of the noted mass-produced economical industrial vertical crankshaft engine, such as produced by mass manufacturers such as Kohler, Briggs & Stratton, Tecumseh, and the like. The parent invention enables usage of two cycle or four cycle engines, air cooled or water cooled. The vertical crankshaft in an ATV further enables positioning of the cooling air inlet high on the vehicle, minimizing intrusion of water into the cooling system. Another advantage is that the power take-off shaft can be neatly packaged below the vehicle, maximizing operator safety. Power take-off devices can be attached in a maximally effective plane, namely horizontal. The vertical crankshaft in combination with various power take-off devices, such as pulleys, constant velocity, CV, transmissions or gear devices can be utilized while maximizing packaging efficiency. In a further aspect, the engine fits between the frame rails of the ATV, allowing a narrower package, and minimizing vibration propagation.

Present Invention

The present invention arose during further development efforts relating to the above-noted parent '669 invention.

The present invention relates to drivetrains for various vehicle applications, including ATVs. In one particularly desirable aspect, the invention provides a modular pre-assembled unit ready for drop-in mounting to a vehicle, and providing a drivetrain for the vehicle.

BRIEF DESCRIPTION OF THE DRAWINGS

FIG. 1 is a side schematic elevation view of an ATV constructed in accordance with the parent '669 invention.

FIG. 2 is a top schematic elevation view of the ATV of FIG. 1.

FIG. 3 is a view like FIG. 2 and shows an alternate embodiment.

FIG. 4 is a side schematic elevation view of the ATV of FIG. 3.

FIG. 5 is a view like FIG. 3 and shows an alternate embodiment.

FIG. 6 is a side schematic elevation view of the ATV of FIG. 5.

FIG. 7 is a view like FIG. 5 and shows an alternate embodiment.

FIG. 8 is a view like FIG. 1 and shows an alternate embodiment.

FIG. 9 is a top schematic elevation view of the ATV of FIG. 8.

FIG. 10 is a view like FIG. 1 and shows an alternate embodiment.

FIG. 11 is a top schematic elevation view of the ATV of FIG. 10.

DETAILED DESCRIPTION

Figure 1:
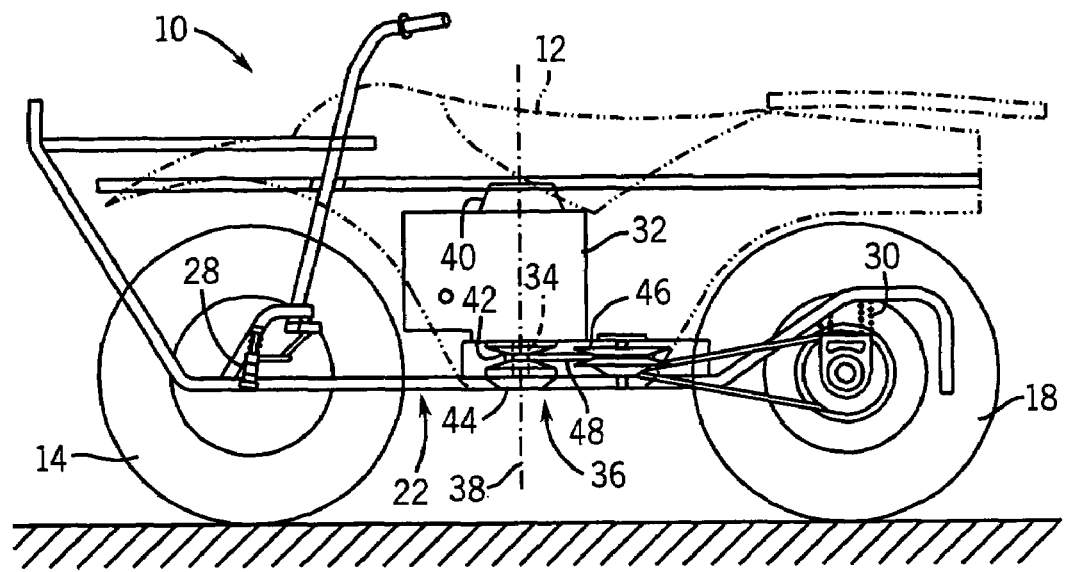
FIGS. 1-11 are taken from the above-noted parent '669 patent.

FIG. 1 shows an ATV 10, all terrain vehicle, having straddle seating at seat 12, i.e. the operator sits on seat 12, with his/her legs straddling same. The ATV includes at least four oversized balloon tires 14, 16, 18, 20, FIGS. 1 and 2. The ATV includes a frame 22 with left and right side rails 24, 26, and front and rear suspensions 28, 30 respectively mounting the tires. An engine 32 is mounted on the frame between the left and right side rails and between the front and rear suspension and has a vertical crankshaft 34. Engine 32 is preferably purchased from a mass manufacturer such as Kohler, Briggs and Stratton, Tecumseh, or the like, and typically ranges from 3 to 22 horsepower.

ATV 10 includes a lower power take-off drive member 36 below the engine and rotating in a horizontal plane about a vertical axis 38. Engine 32 has an upper cooling air inlet 40 above the axes of rotation of the tires, and preferably at or above the tops of the tires. Power take-off drive member 36 includes a primary pulley 42 at the lower end of vertical crankshaft 34. A constant velocity clutch 44 is provided for engaging and disengaging the pulley. Pulley 46 is driven by pulley 42, and each pulley rotates in a coplanar horizontal plane. Pulley 46 is spaced below straddle seat 12 and vertically aligned therewith. Each pulley 42 and 46 is preferably at a level at or below the axes of rotation of the tires. Primary pulley 42 drives secondary pulley 46 by coplanar drive belt 48. Pulley 46 drives rear wheel tires 18 and 20 by V-belt 50 driving pulley 52 on rear axle 54. Axle 54 is a live axle, and ATV 10 is a two wheel drive vehicle. Front wheels 14 and 16 are connected by live axle 55. The vehicle is braked by disc brake 56 actuated by cable 58 from foot brake pedal 60 on foot rest 62. The brake may also be actuated from left foot rest 64.

Figure 2:
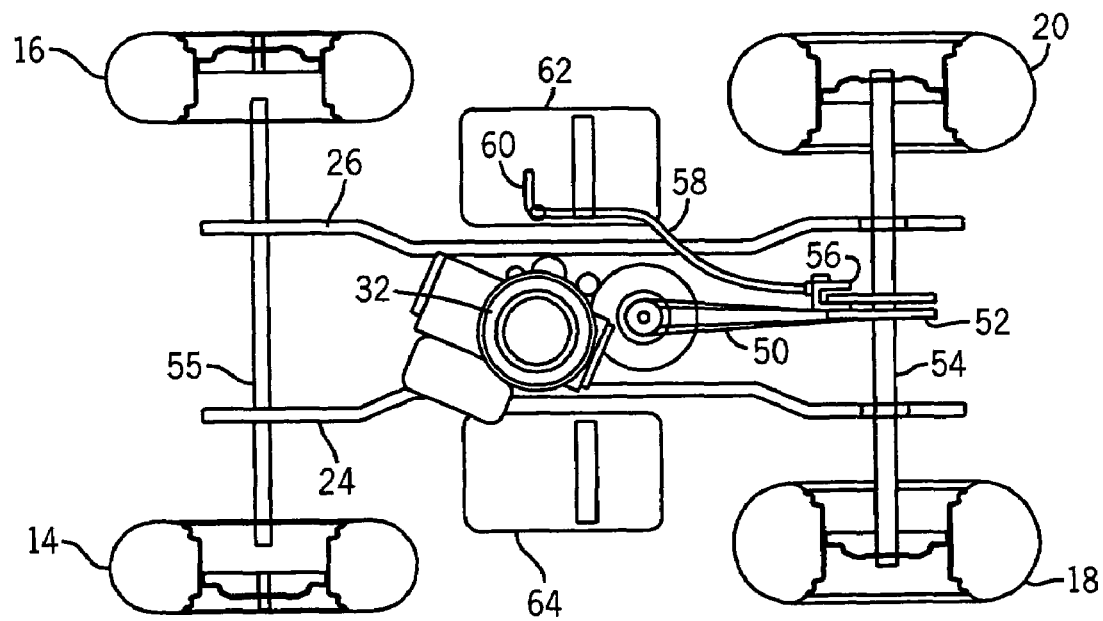
Figure 3:
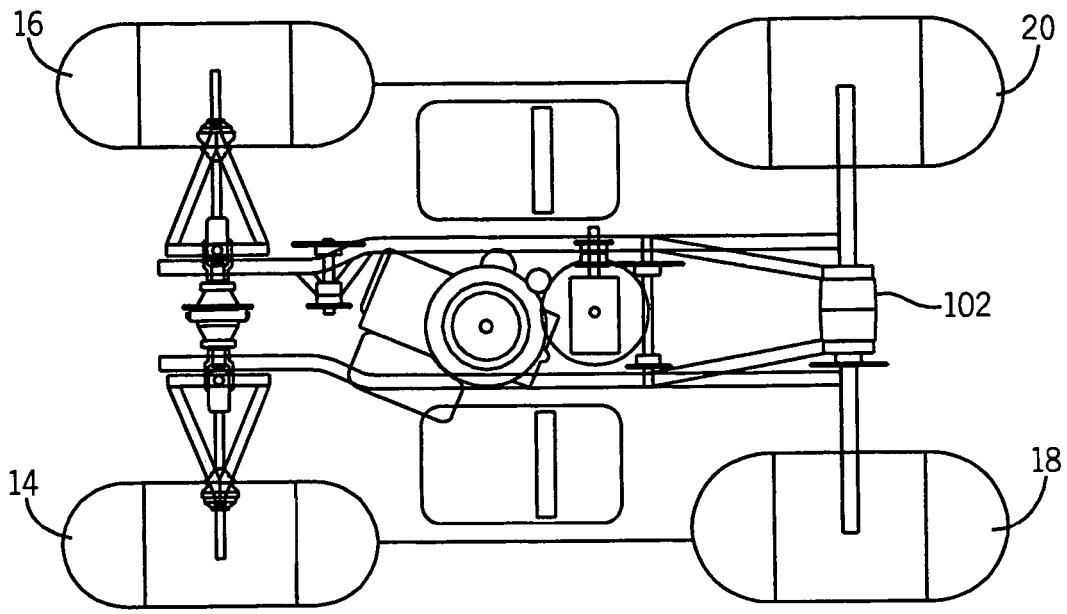
Figure 4:
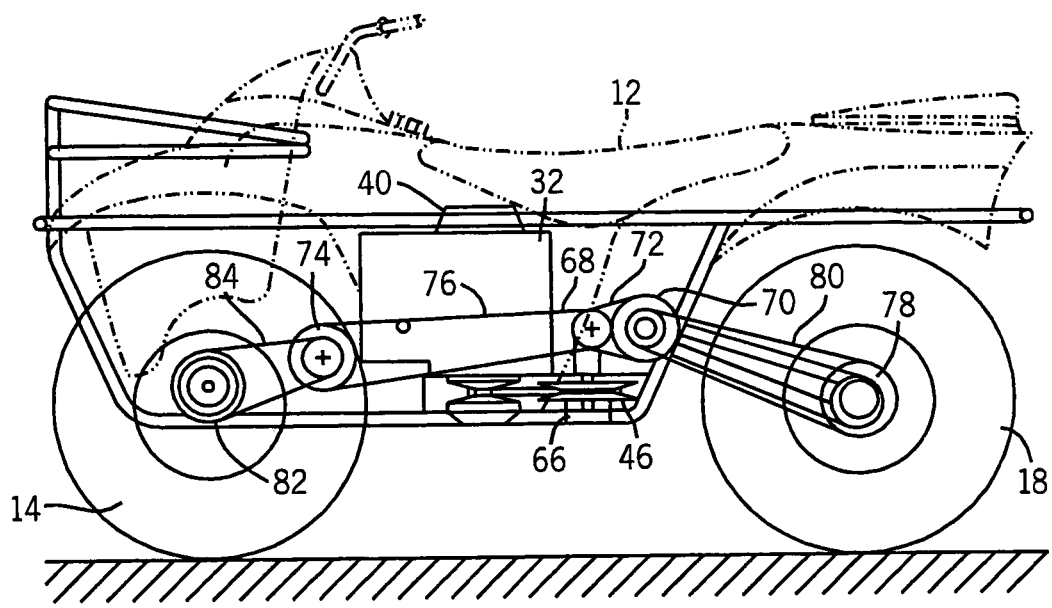
Figure 5:
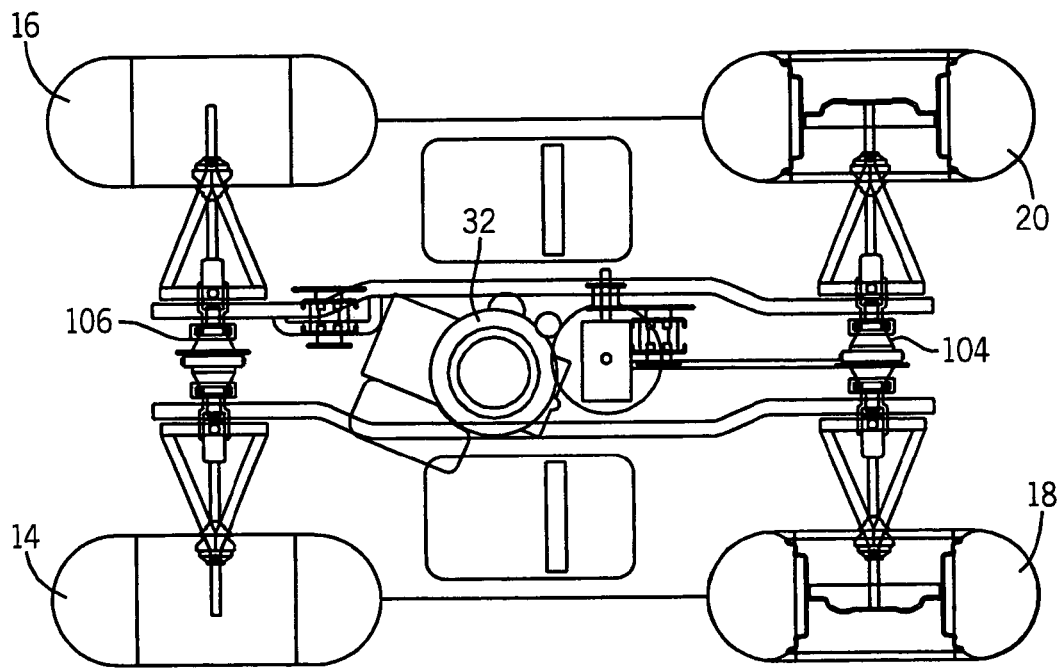
Figure 6:
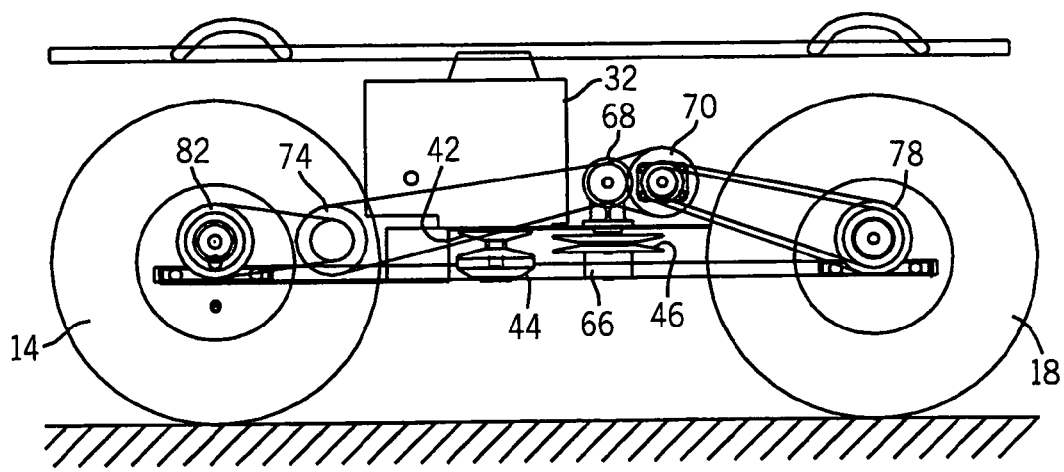
Figure 7:
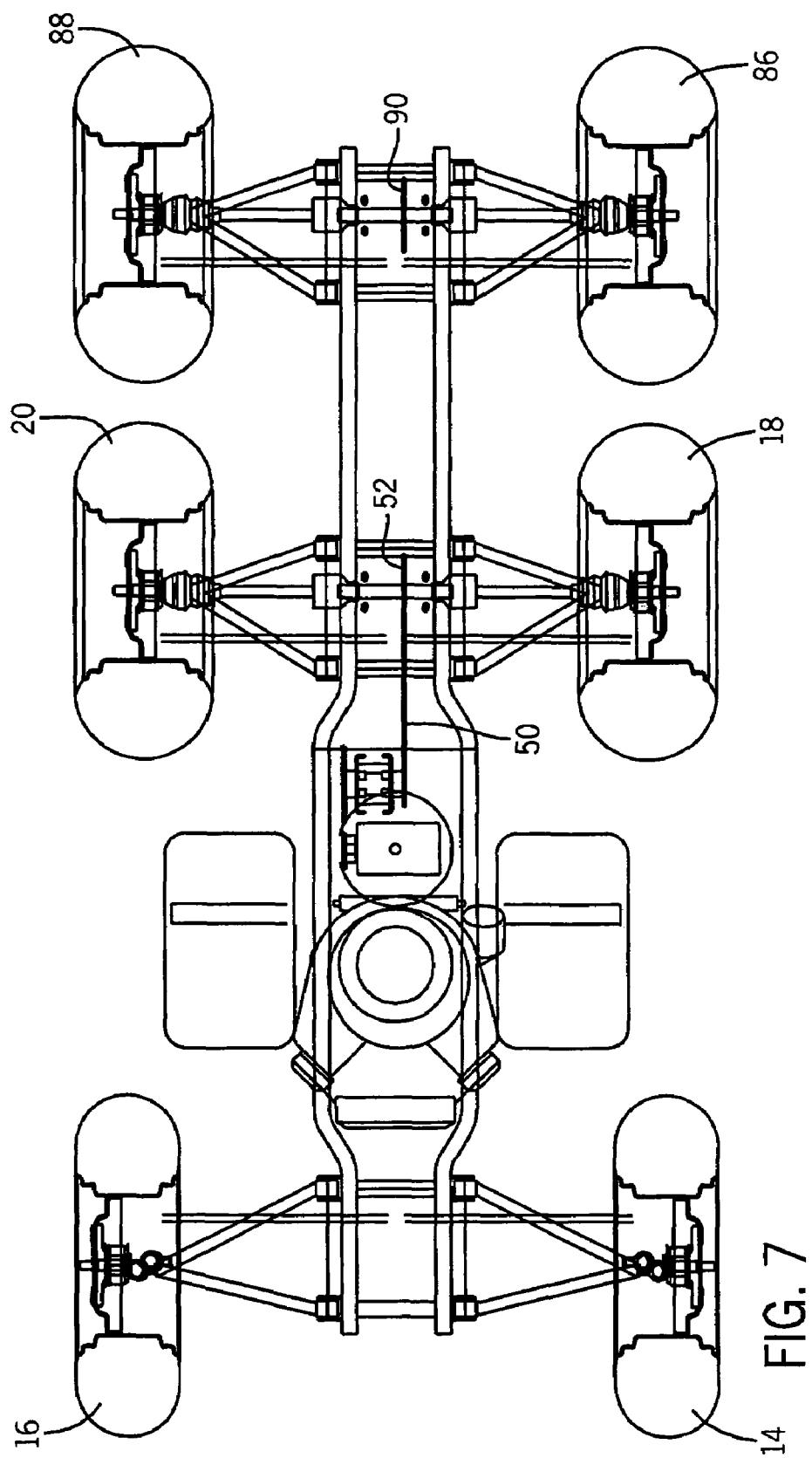
Figure 8:
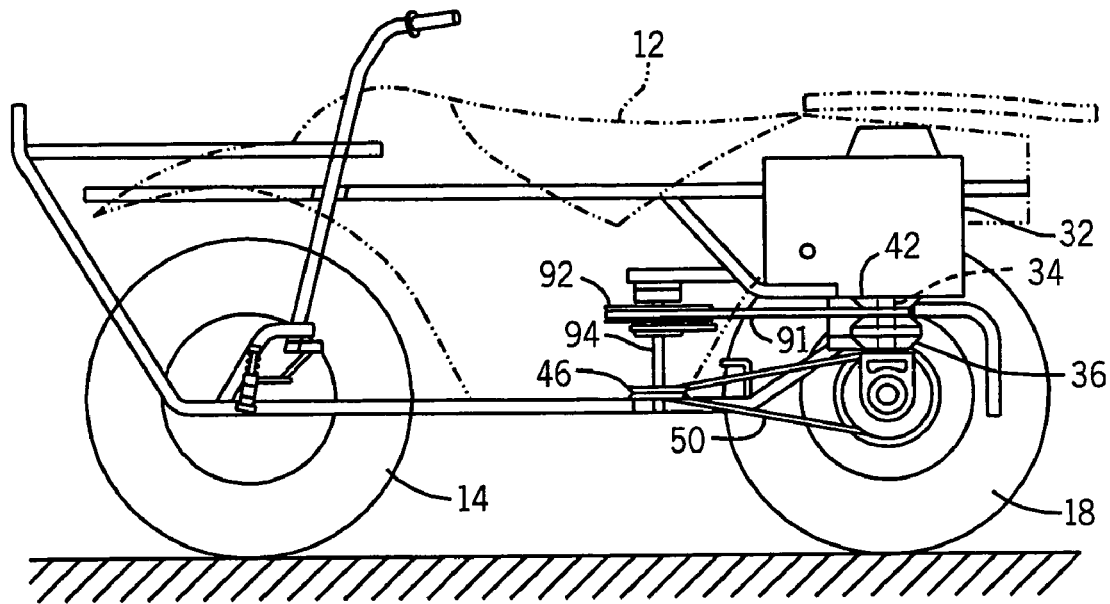
Figure 9:
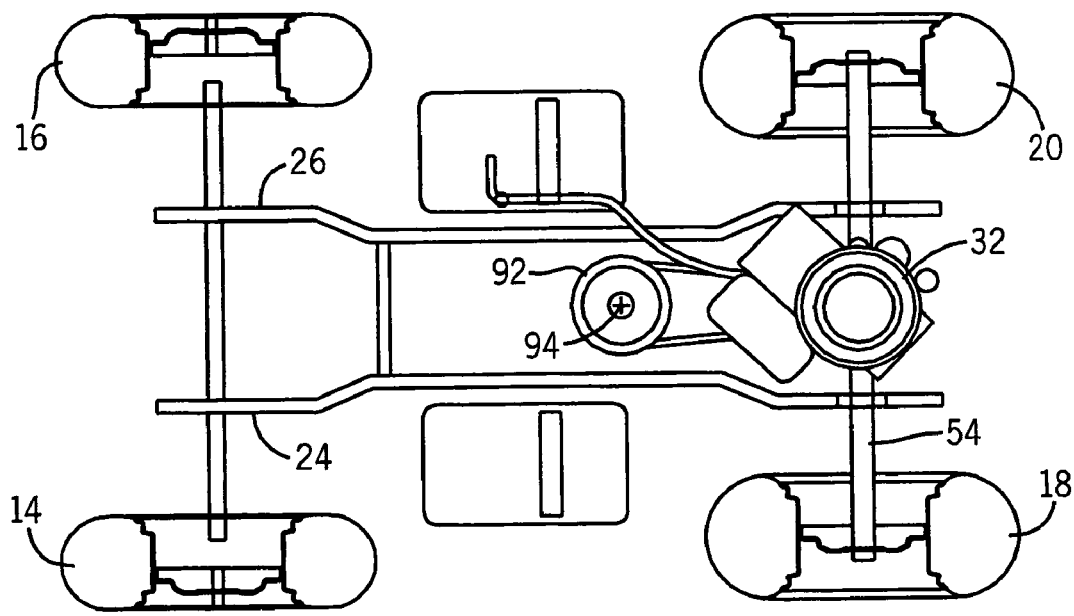
Figure 10:
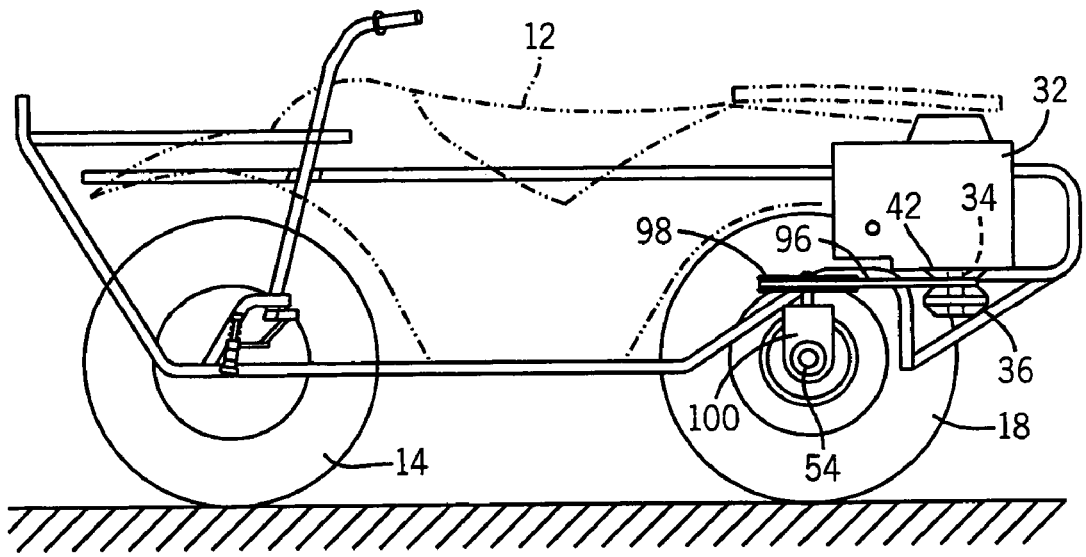
Figure 11:
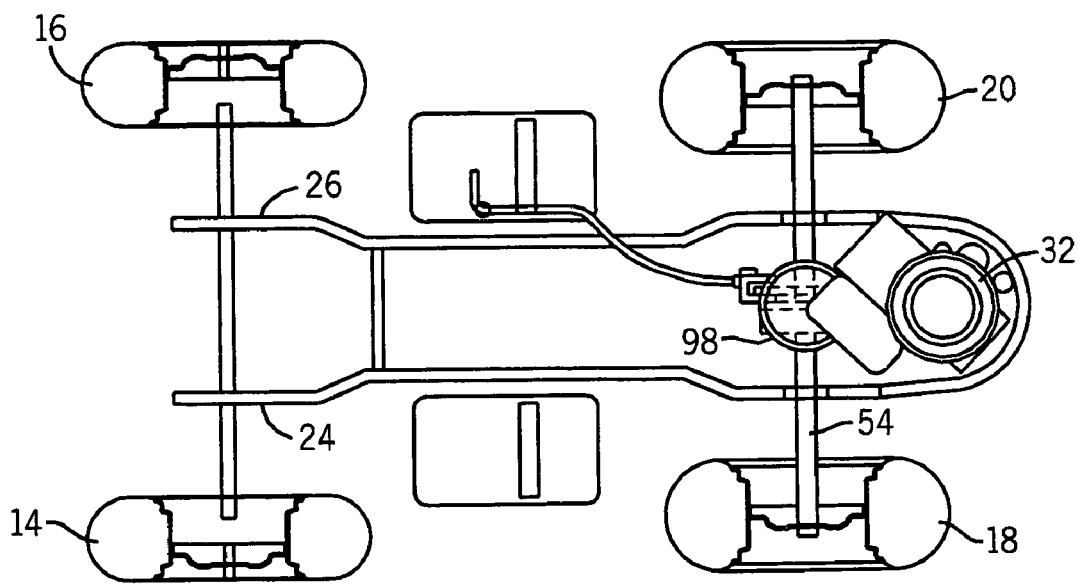

FIGS. 3 and 4 are similar to FIGS. 1 and 2 and show how the parent invention enables a four wheel drive ATV, with a live rear axle and independently suspended front wheels. Secondary pulley 46 drives a 90° transmission 66, which is known in the art, which in turn drives pulley 68 which drives pulley 70 via belt 72 and which drives pulley 74 via belt 76. Pulley 70 drives rear transmission 78 via belt 80, to in turn drive rear wheel tires 18, 20. Pulley 74 drives front transmission 82 via belt 84 to drive front wheel tires 14, 16. FIGS. 5 and 6 illustrate how the parent invention enables a four wheel ATV with independent rear wheels and independent front wheels. FIG. 7 illustrates how the parent invention further enables a six wheel ATV, with additional rear wheel tires 86, 88. If these latter wheels are also to be drive wheels, then an additional drive belt is connected from pulley 52 or 78 to rear pulley 90 or a transmission. If a six wheel drive vehicle is desired, then an additional front drive pulley and belt are provided, as in FIGS. 3-6. FIGS. 8 and 9 show an ATV similar to that of FIGS. 1 and 2, but with engine 32 and its vertical crankshaft 34 directly over rear axle 54, wherein power take-off drive member 36 and primary pulley 42 driving drive belt 91 to drive pulley 92 on vertical shaft 94 which drives pulley 46 which drives rear wheel tires 18 and 20 by V-belt 50 as above. FIGS. 10 and 11 show an ATV similar to FIGS. 1 and 2, but with engine 32 and its vertical crankshaft 34 rearward of rear axle 54, with power take-off drive member 36 and primary pulley 42 driving drive belt 96 to drive pulley 98 driving a 90° transmission 100 to drive rear axle 54. In various embodiments, two drive wheels may be connected and driven through a differential, for example, 102, FIG. 3, 104, 106, FIG. 6.

Figure 12:
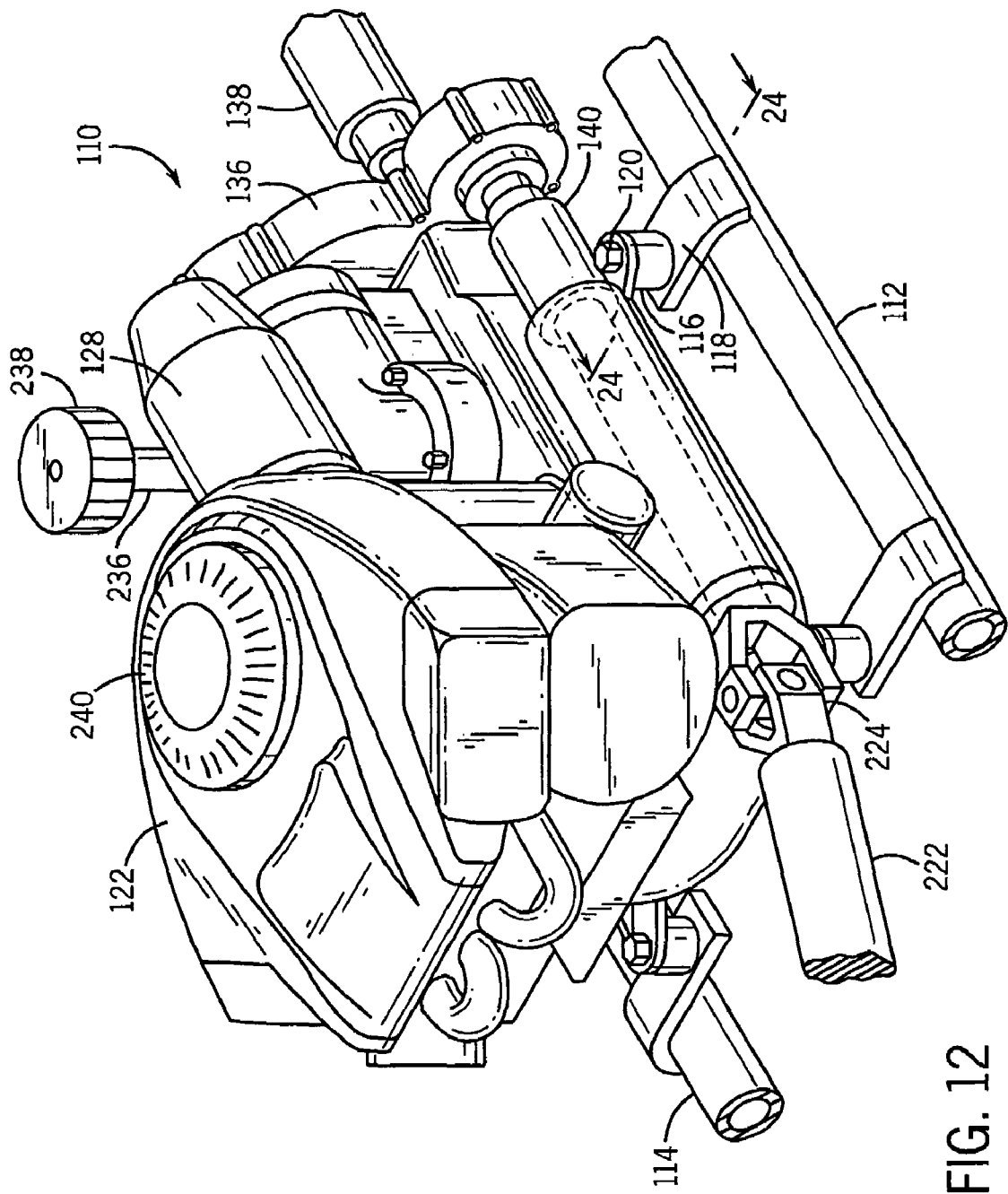
FIG. 12 is an isometric view of a vehicle drivetrain in accordance with the present invention.
Figure 13:
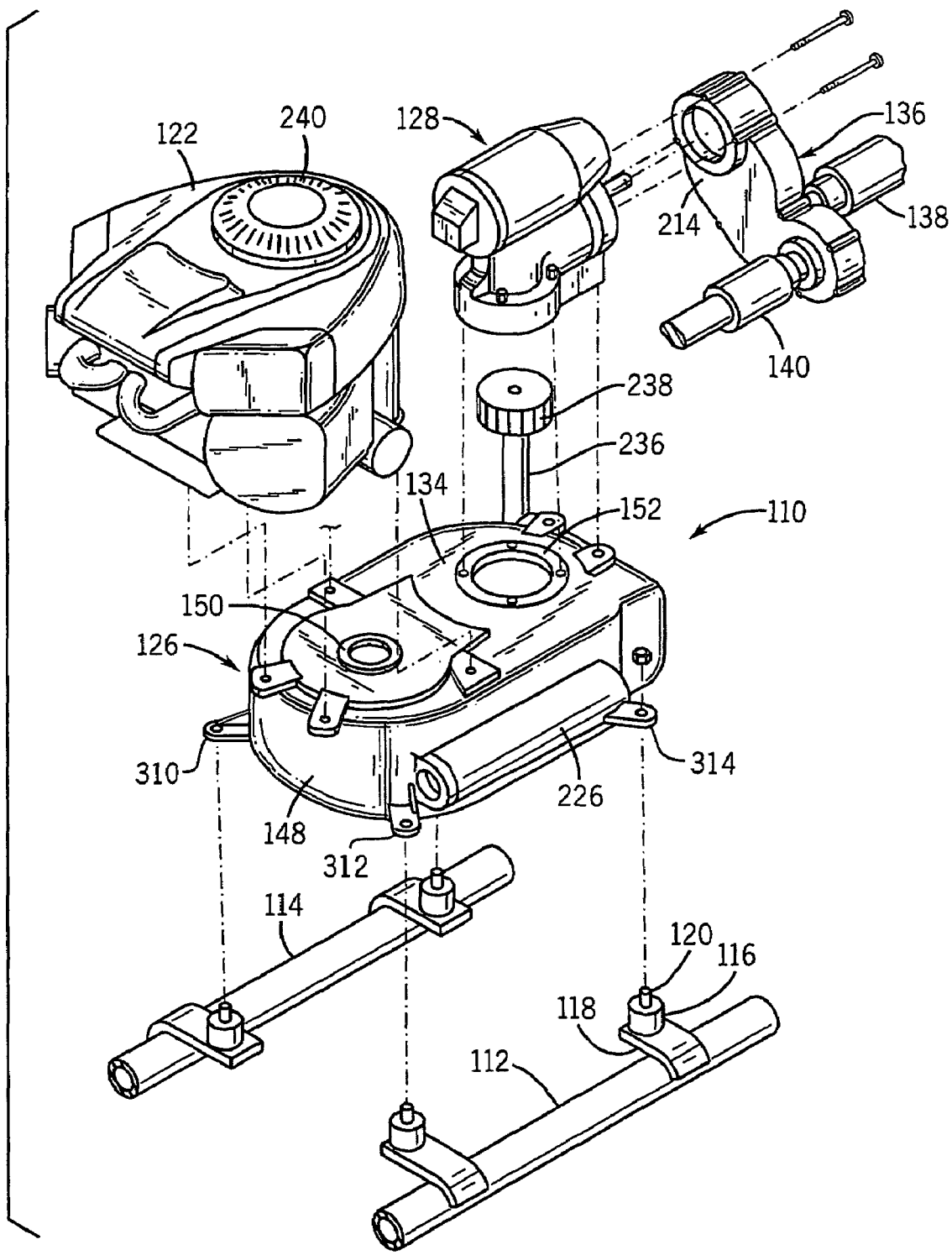
FIG. 13 is an exploded isometric view of the construction of FIG. 12.
Figure 14:
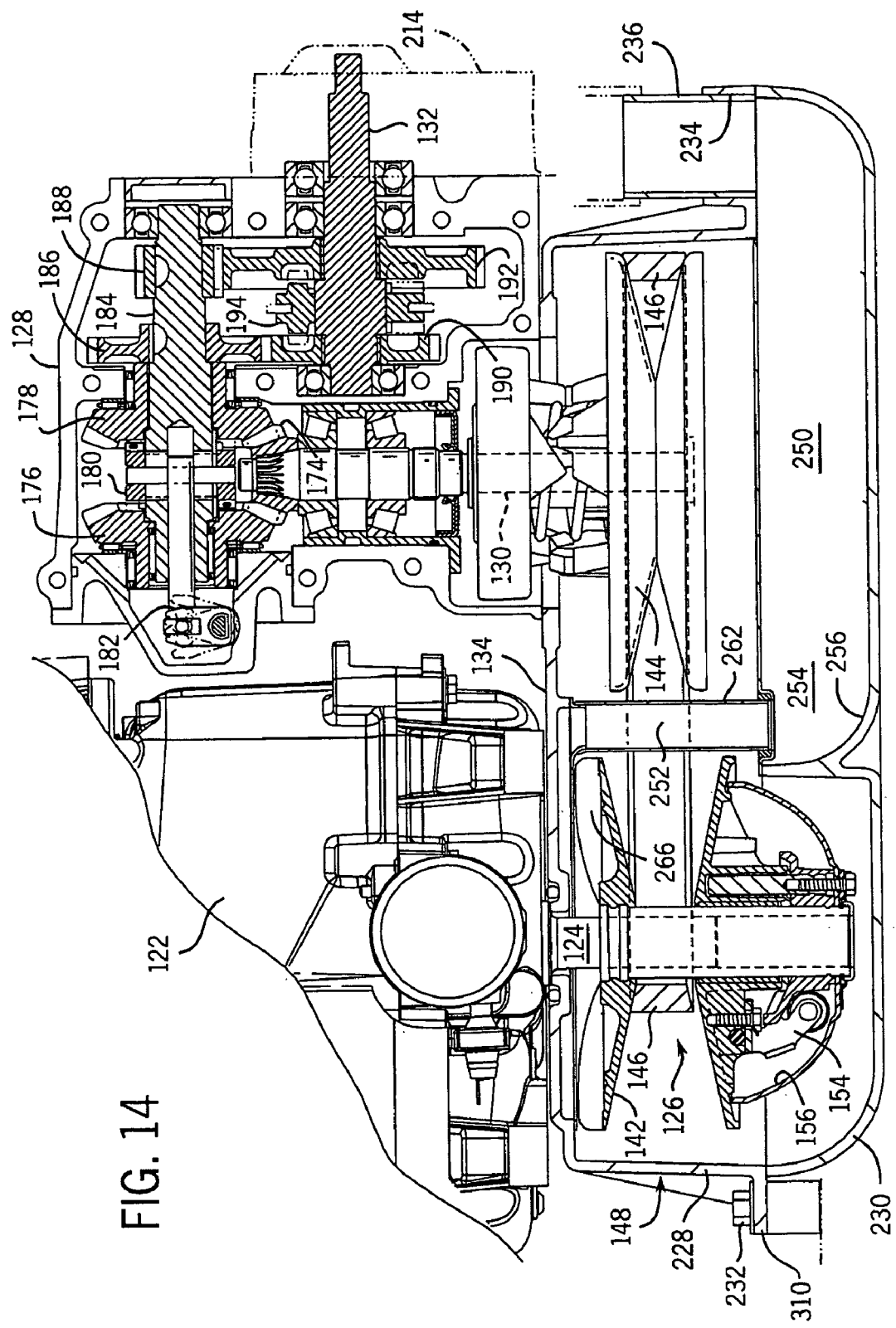
FIG. 14 is a side sectional view of a portion of the construction of FIG. 12.
Figure 15:
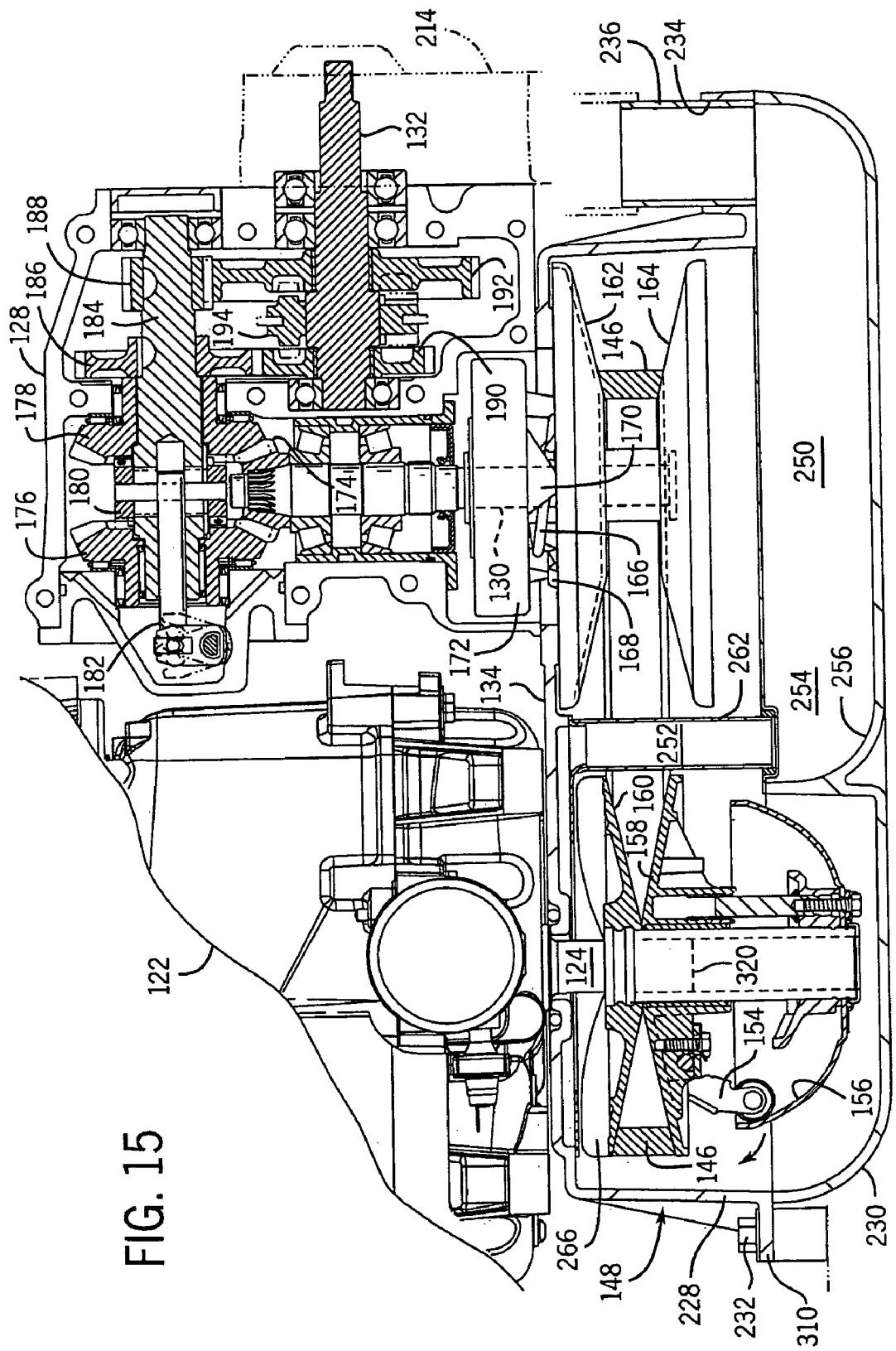
FIG. 15 is like FIG. 14 and further illustrates operation.
Figure 16:
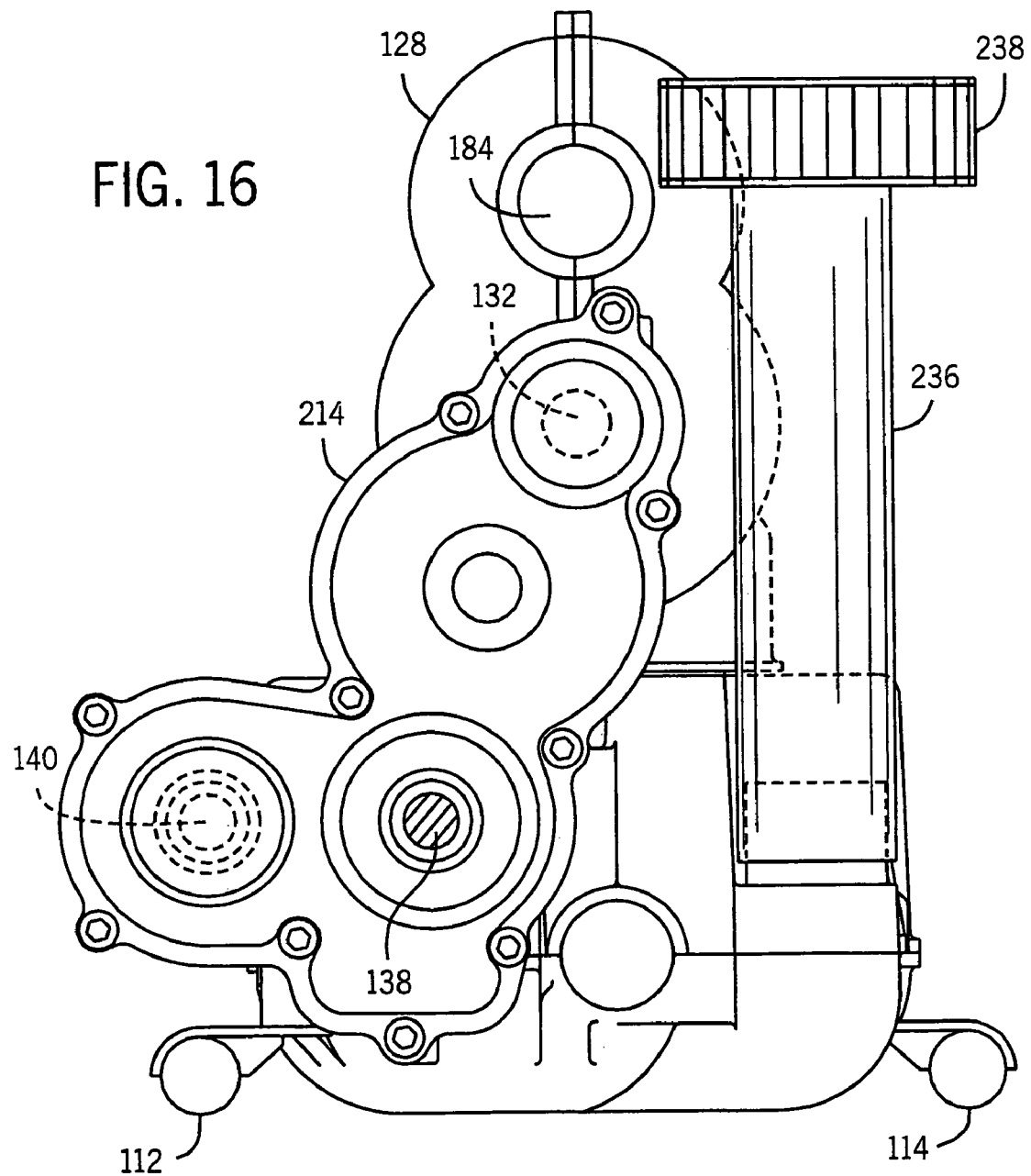
FIG. 16 is an end view of the construction of FIG. 12.
Figure 17:
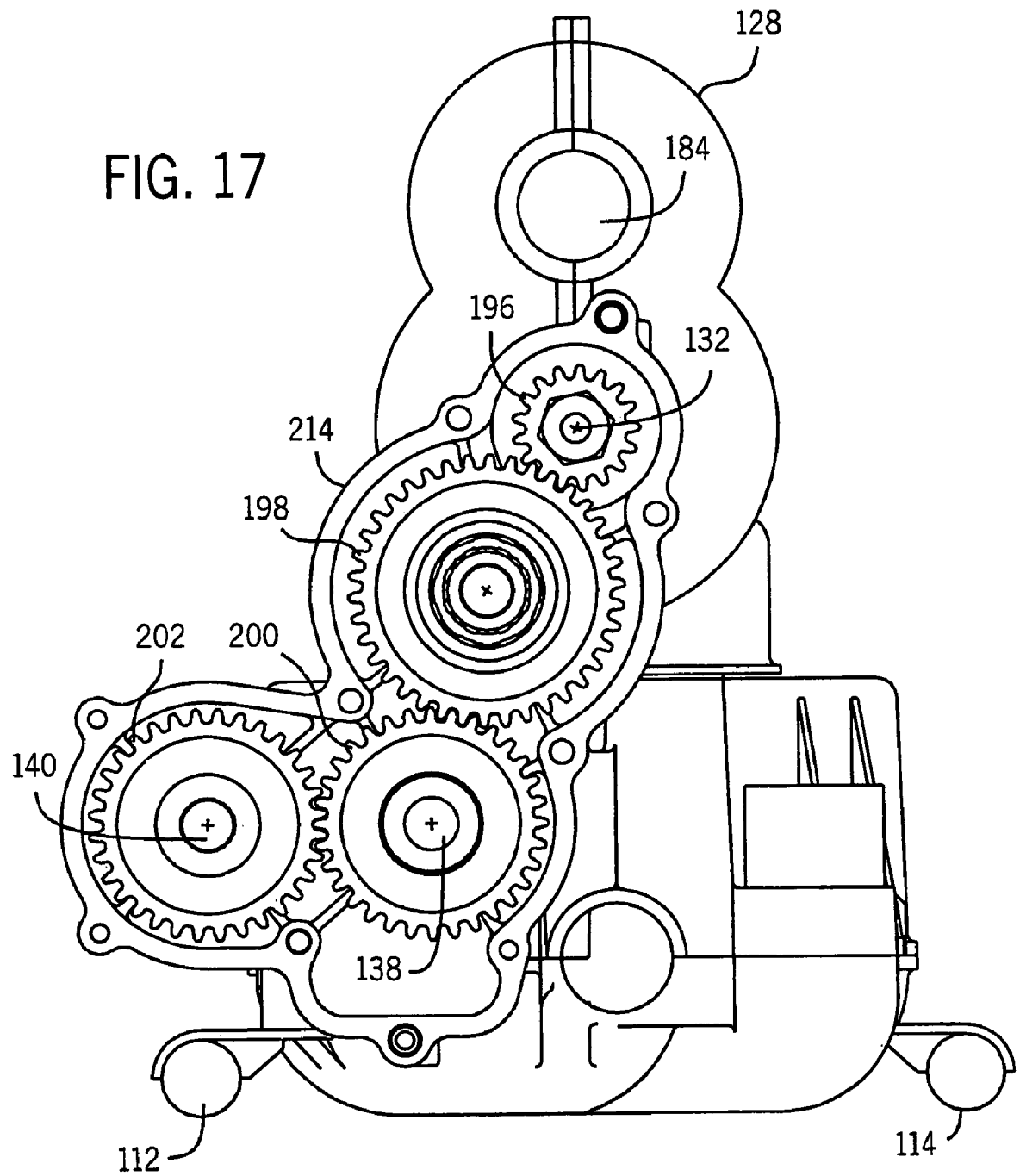
FIG. 17 is like FIG. 16 with portions removed.
Figure 18:
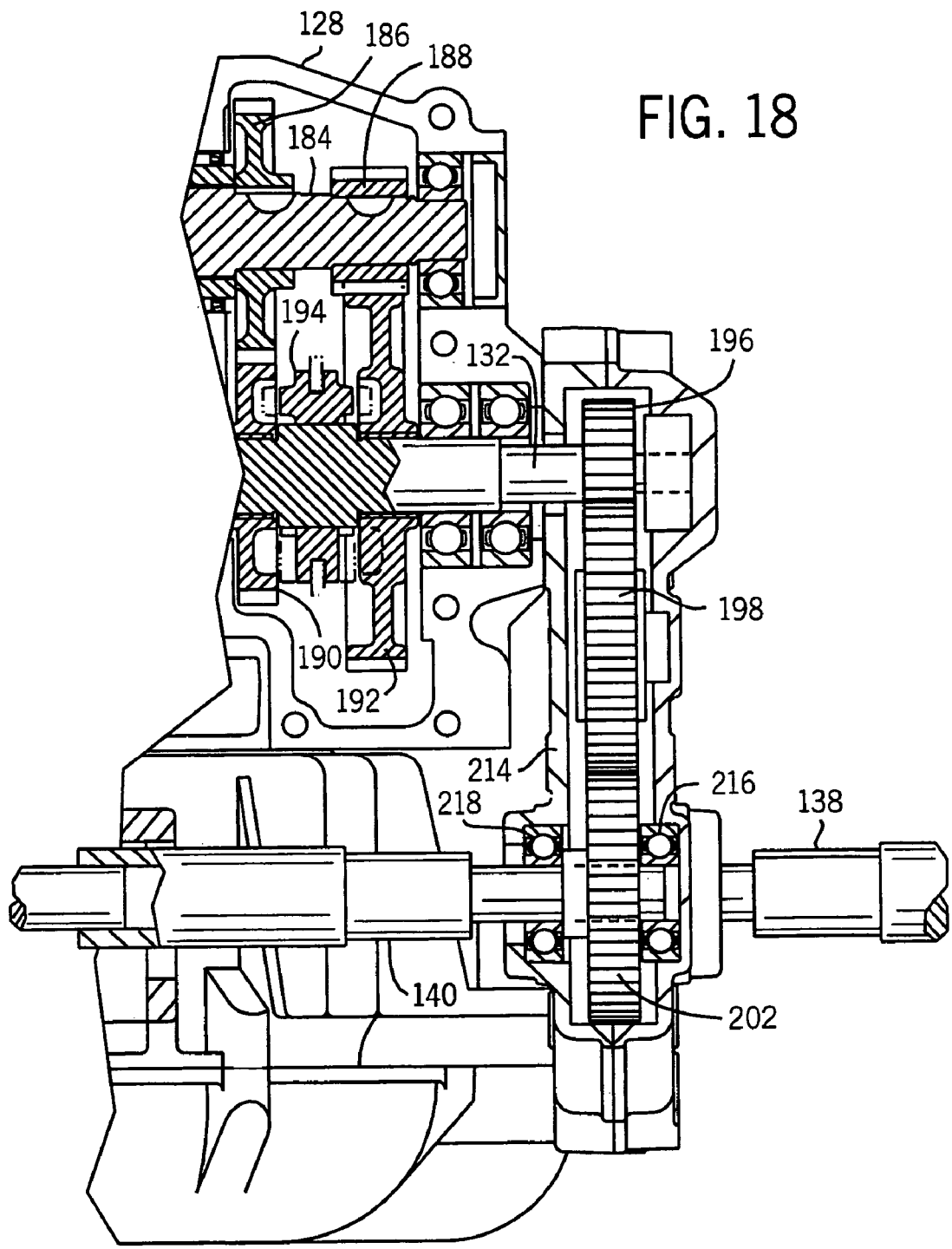
FIG. 18 is a side sectional view of the construction of FIG. 17.
Figure 19:
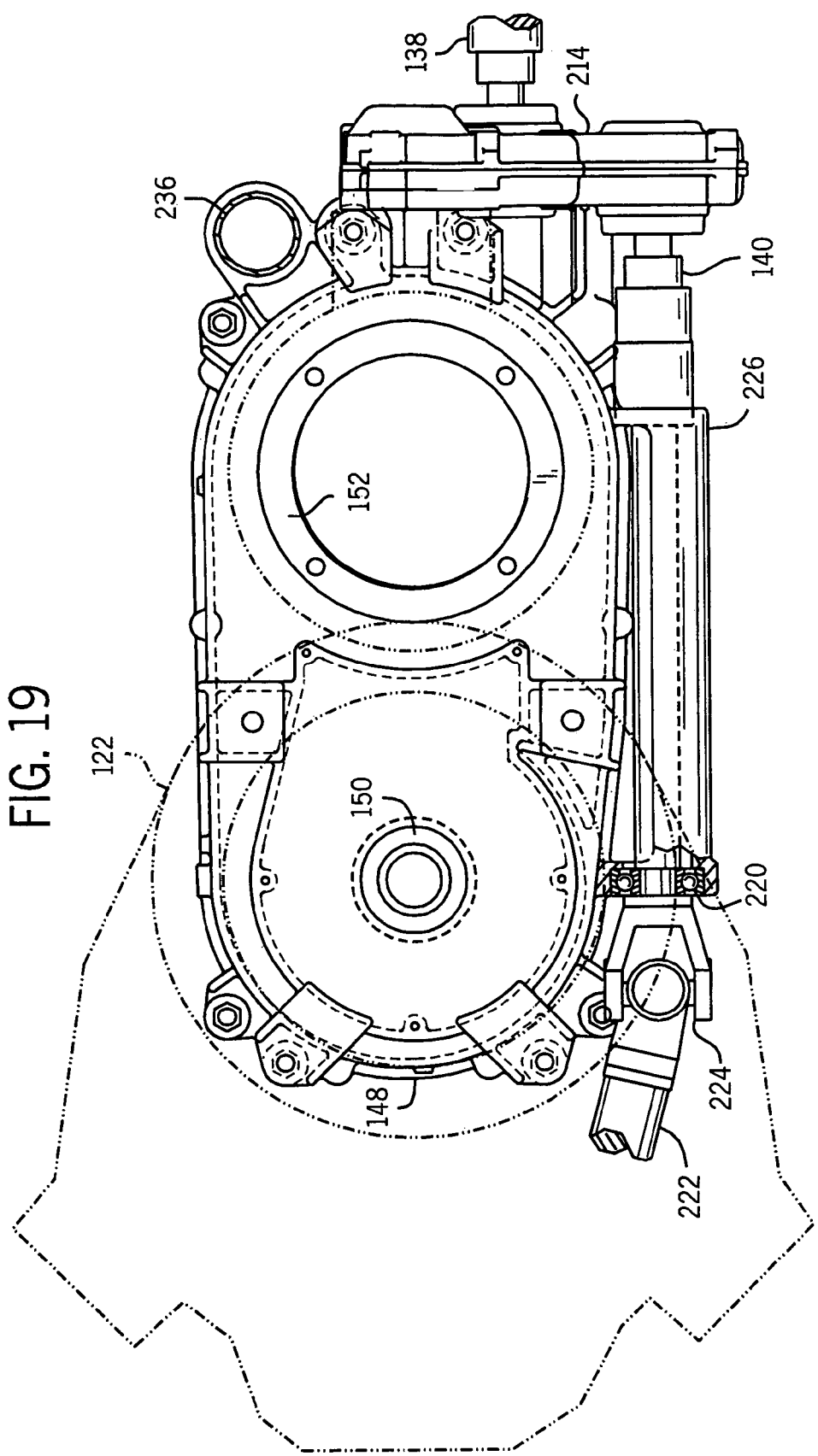
FIG. 19 is a top view of the construction of FIG. 12 with portions removed.
Figure 24:
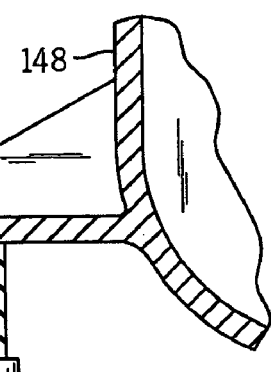
FIG. 24 is a sectional view taken along line 24-24 of FIG. 12.

FIG. 12 shows a vehicle drivetrain 110 for mounting to a vehicle, for example at vehicle frame rails such as 112, 114, on shock and vibration absorbing pads 116, FIG. 24, on frame rail flanges 118 and secured by bolts 120. The vehicle may be an ATV as above, with frame rails 112, 114 corresponding to above noted rails 24, 26, respectively. Drivetrain 110 includes an engine 122, comparable to engine 32, having a vertical crankshaft 124, FIG. 14, comparable to above noted vertical crankshaft 34, and providing a PTO, power take-off shaft. A first transmission 126, FIG. 13, is below engine 122 and is driven by vertical crankshaft 124 of the engine. A second transmission 128 is above first transmission 126 and horizontally adjacent engine 122. Second transmission 128 has an input shaft 130, FIG. 14, driven by first transmission 126, and has an output shaft 132 providing vehicle propulsion, to be described. The drivetrain propels the vehicle in a forward direction, which is leftward in FIGS. 12-15. Second transmission 128 is aft of engine 22 and has the noted vertical input shaft 130 aft of the vertical crankshaft 124, and has the noted horizontal output shaft 132 aft of vertical input shaft 130, and driven thereby, to be described. Each of engine 122 and second transmission 128 are mounted to first transmission 126 at an upper surface 134 thereof, FIG. 13, such that shafts 124 and 130 extend vertically and in parallel above first transmission 126. A power transfer device 136, to be described, is driven by second transmission 128 to transfer power to propel the vehicle. In one embodiment, the power transfer device has a pair of driveshafts 138, 140 driven in torque balancing counter-rotation, with aft or rear driveshaft 138 providing vehicle propulsion, e.g. by connection through a standard differential to the rear wheels, and with forward shaft 140 also providing vehicle propulsion by driving the front wheels and/or providing power to drive an accessory or implement mounted to the vehicle or to drive an electrical generator or any other use where it is desired to transfer power from a driven rotary shaft.

In preferred form, first transmission 126 is a constant velocity clutch continuously variable transmission, CVT, which is known in the prior art, for example U.S. Pat. Nos. 3,939,720, 6,095,937, incorporated herein by reference. CVT 126 has a first pulley 142, FIG. 14, driven by shaft 124, a second pulley 144 driving input shaft 130 of second transmission 128, and a belt 146 extending around the pulleys and driving second pulley 144 from first pulley 142. The pulleys rotate in a horizontal plane. A CVT mounting case 148 houses pulleys 142 and 144. Engine 122 and second transmission 128, FIG. 13, are each mounted to CVT mounting case 148 by respective bolts at respective first and second mounting attachment locations 150 and 152 precisely spaced and aligned to provide precise spacing of the centerlines of shafts 124 and 130 and precise alignment of such shafts in parallelism. This is significant in a CVT to provide consistent clutch engagement speed and maximally effective shift ratios. This is also important for improved belt life. Both the precise centerline to centerline spacing of the shafts and the precise parallel alignment of the shafts is significant. As is known, as engine speed increases, roller cranks 154, FIG. 14, move outwardly by centrifugal force and upwardly along cam surface 156, to in turn move lower pulley sheave 158 upwardly toward upper pulley sheave 160 to close the gap therebetween such that belt 146 moves radially outwardly in pulley 142 and radially inwardly in pulley 144 as upper sheave 162 of the latter moves upwardly away from lower sheave 164 and against the bias of spring 166, such that teeth 168 on sheave 162 engage teeth 170 of flywheel 172 to in turn rotate shaft 130. This is standard CVT operation.

Second transmission 128 is preferably a 90° gear transmission preferably provided by a dog clutch, which is known in the prior art, for example U.S. Pat. Nos. 4,118,996, 4,630, 719, 4,679,682, 4,869,121, 4,952,181, 6,062,360, incorporated herein by reference. Input shaft 130 has a beveled pinion gear 174 driving beveled driven gears 176, 178 in counter-rotation, and having a clutch 180 shiftable left-right in FIG. 14 between gears 176 and 178 by shift linkage 182 to rotate shaft 184 either clockwise or counter-clockwise depending on which of gears 176 and 178 is engaged, to selectively provide forward or reverse, all as is standard. Shaft 184 has high and low gears 186 and 188, respectively, driving high and low driven gears 190 and 192 on shaft 132 having left-right slidable clutch 194 thereon for selecting which gear to engage.

Figure 20:
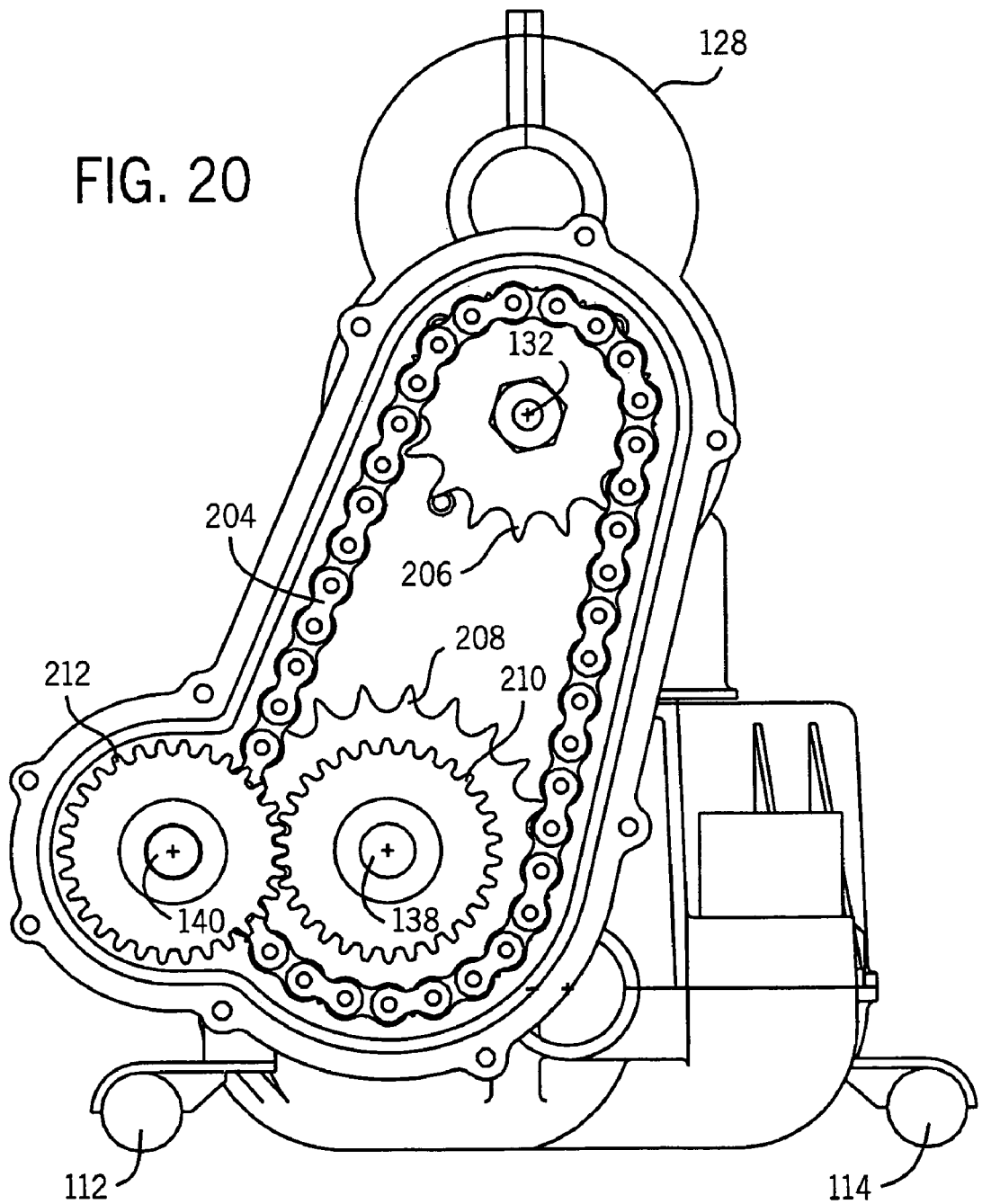
FIG. 20 is like FIG. 17 and shows an alternate embodiment.

As noted above, output shaft 132 drives power transfer device 136, FIGS. 13, 16-19. In the preferred embodiment, the power transfer device is a power transfer rotary drive member driven by shaft 132, including a drive gear 196, FIGS. 17, 18, on shaft 132 driving intermediate transfer gear 198 which drives driven gear 200 on driven shaft 138 which drives gear 202 on driven shaft 140. In an alternate embodiment, the power transfer rotary drive member is provided by a chain drive, FIG. 20, having chain 204 extending around sprocket gear 206 on shaft 132 and sprocket gear 208 on shaft 138, which sprocket 208 has a gear 210 driving gear 212 on shaft 140.

The transfer case 214, FIG. 13, houses the noted power transfer rotary drive member. The transfer case is mounted to at least one and preferably both of second transmission 128 and CVT mounting case 148 for enhanced rigidity of the combination of the CVT mounting case and components mounted thereto, namely engine 122, second transmission 128 and transfer case 214. This combination is further preferred for bearing drivetrain and load related stress. Driveshaft 138 is mounted to the transfer case in journaled relation at bearing 216. Driveshaft 140 is mounted to the transfer case in journaled relation at bearing 218, and is mounted to the CVT mounting case in journaled relation at bearing 220, FIG. 19. Driveshaft 140 may be connected to a further forwardly extending driveshaft 222 by a universal joint 224. The CVT mounting case includes a protective shroud 226 partially covering driveshaft 140.

Figure 25:
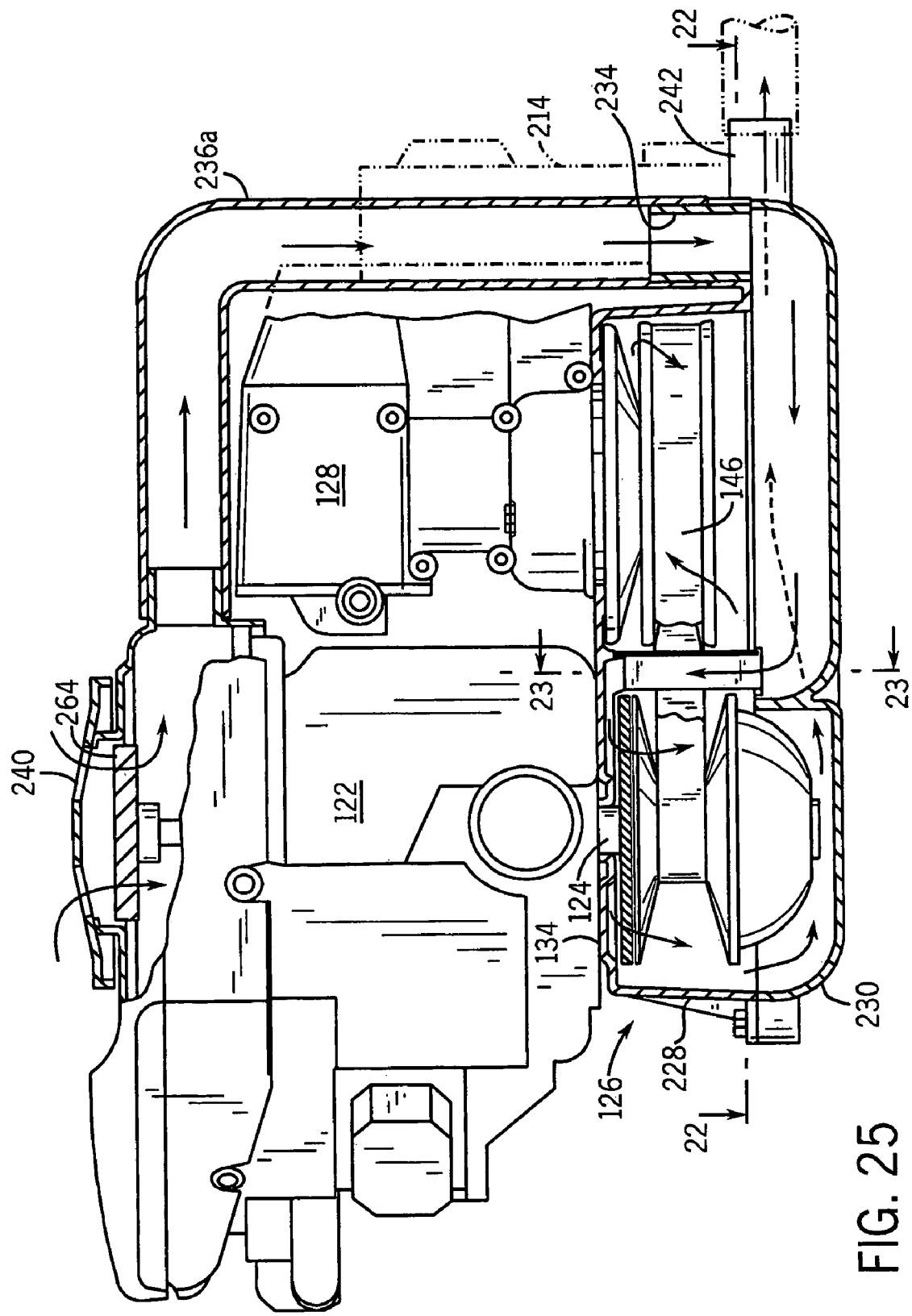
FIG. 25 is a side view partially in section of FIG. 12 and showing an alternate embodiment.

The CVT mounting case is preferably a sealed case enclosing and protecting pulleys 142, 144 and belt 146 against the elements, including water. The case is provided by a rigid upper clamshell portion 228, FIG. 14, and a lower clamshell portion 230 bolted together as at bolts 232. The upper clamshell portion has an air inlet port 234 receiving cooling air through air hose or tube 236 extending upwardly and having an air filter 238, FIG. 12, at the top thereof, or extending as shown at tube 236a, FIG. 25, to receive engine inlet air at 240.

Figure 21:
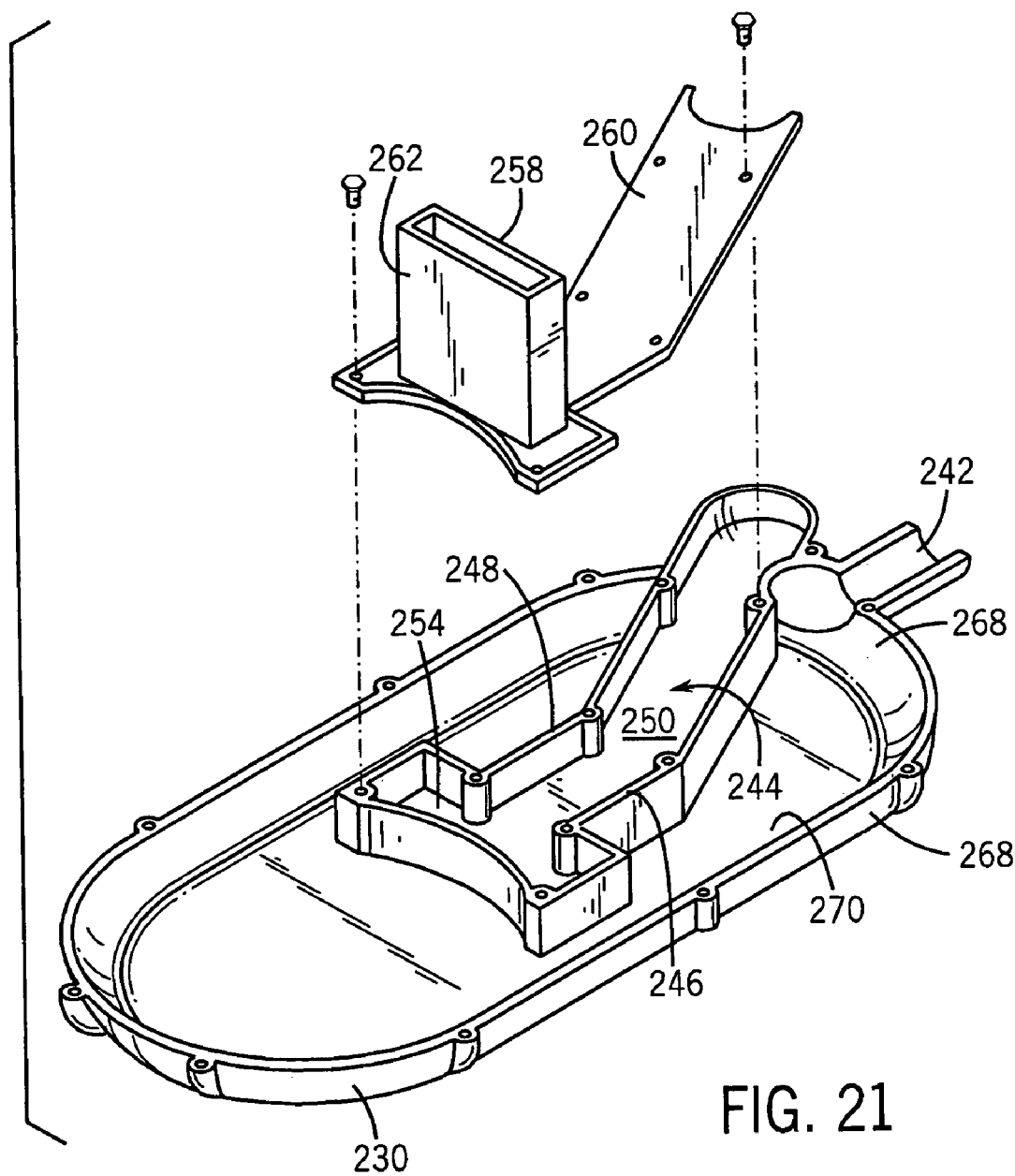
FIG. 21 is an exploded isometric view of a portion of a component of FIG. 13.

Lower clamshell portion 230 of the CVT mounting case has an air outlet port 242, FIG. 21, and an air circuit duct 244 therein directing air from air inlet port 234 around pulleys 142, 144 and belt 146 for cooling same, and then to air outlet port 242. Lower clamshell portion 230 has a pair of upstanding walls 246 and 248 horizontally spaced from each other and defining a supply passage 250 therebetween extending from air inlet port 234 and directing cooling air to pulleys 142, 144 and belt 146. The pulleys are separated by a gap 252, FIG. 14, and supply passage 250 extends to an area 254 below such gap. Lower clamshell 230 has a deflector ramp 256 in supply passage 250 and deflecting cooling air upwardly to gap 252. A transfer duct 258, FIG. 21, has a portion 260 covering supply passage 250, and has an upper duct portion 262 extending from the lower clamshell portion upwardly into gap 252 between the pulleys and spaced laterally inwardly of belt 146, FIGS. 22, 23, and transferring cooling air from supply passage 250. In one embodiment, air tube 236a, FIG. 25, extends between a cooling fan 264 of the engine and air inlet port 234 and supplies cooling air from fan 264 to air inlet port 234. In another embodiment, pulley 142 has fins 266, FIG. 14, thereon, which provides a fan circulating cooling air from air inlet port 234 through the CVT mounting case to air outlet port 242 during rotation of pulley 142. Lower clamshell portion 230 has an outer peripheral sidewall 268, FIG. 21, defining a return passage 270 between sidewall 268 and upstanding walls 246, 248. Air outlet port 242 is through outer peripheral sidewall 268.

Figure 26:
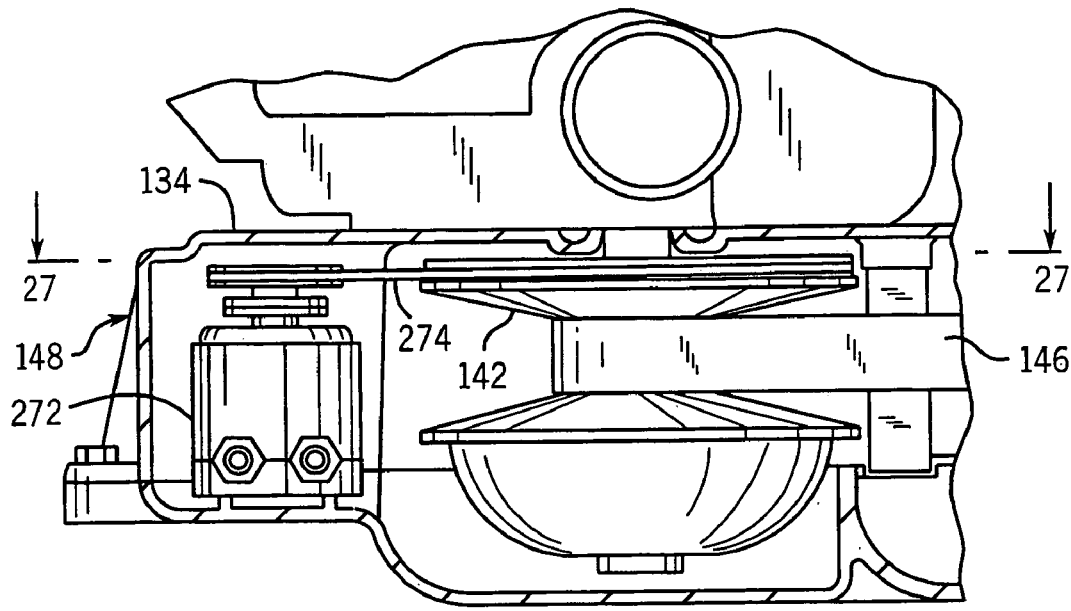
FIG. 26 is a side view like a portion of FIG. 25 and showing a further alternate embodiment.
Figure 27:
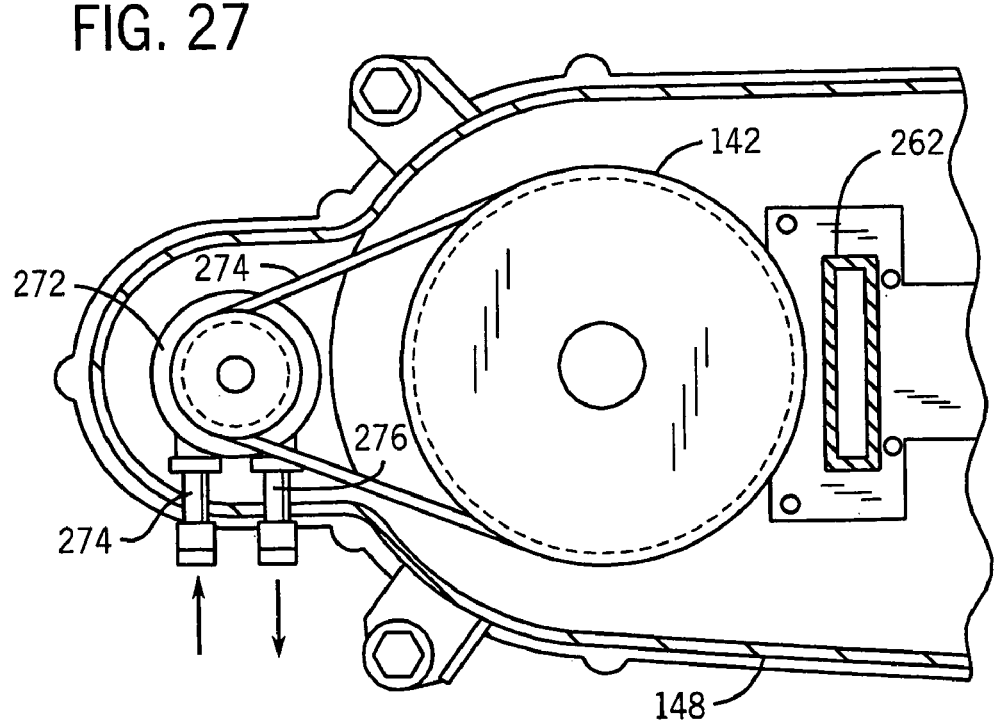
FIG. 27 is a sectional view taken along line 27-27 of FIG. 26.

In a further embodiment, the CVT mounting case also houses a hydraulic pump 272, FIGS. 26, 27 driven by one of the pulleys, preferably pulley 142, by belt 274. Hydraulic pump 272 is forward of pulley 142. Hydraulic pump 272 is enclosed by the noted upper and lower clamshell portions of the CVT mounting case together with pulleys 142, 144. The hydraulic pump has input and output hydraulic lines 274, 276 extending through the CVT mounting case.

A significant aspect of the invention is that it provides a modular pre-assembled unit ready for drop-in mounting to a vehicle, and providing a drivetrain for the vehicle. This enables a simplified manufacturing method for installing drivetrain components in a vehicle, by mounting engine 122 and second transmission 128 to first transmission 126 as a self-contained pre-assembled modular unit, with the noted precise spacing of the centerlines of shafts 124 and 130 and the noted precise alignment of such shafts in parallelism, followed by drop-in mounting as a modular unit to the vehicle. Engine 122 and second transmission 128 are mounted to the CVT mounting case at the noted respective first and second mounting attachments 150 and 152 precisely spaced and aligned to provide precise spacing of the centerlines of shafts 124 and 130 and precise alignment of such shafts in parallelism in the pre-assembled modular unit. The pulleys are then mounted to such shafts, followed by mounting of lower clamshell portion 230 to upper clamshell portion 228, followed by the noted drop-in mounting to the vehicle, e.g. on vehicle frame rails 112, 114, for example at mounting flanges 118. In an alternate embodiment, lower clamshell portion 230 is omitted, to provide an unsealed CVT mounting case, and with cooling air merely being supplied from inlet 234 to the vicinity of pulleys 142, 144, and belt 146. CVT mounting case portion 228 still provides the noted desirable rigid mounting base and combination for engine 122, transmission 128, and transfer case 214, as well as the noted precise centerline to centerline spacing of shafts 124 and 130 and the noted precise parallelism of such shafts. In a further alternative, the CVT mounting case including at portion 228 can be provided by a split housing, one section for each of shafts 124 and 130, respectively, which split housing sections are then precisely mounted to each other and then to the vehicle to provide the noted precise spacing and parallelism. In a further embodiment, the modular unit provided by components 122, 126, 128, 136 may be rotated 90° about a vertical axis to a transverse position, providing a driven output shaft extending transversely and which may be used in a transverse driving arrangement for the vehicle such as shown in FIG. 6, or may be used to drive a gear train. In a further embodiment, the modular unit provided by components 122, 126, 128, 136 may be rotated 180° about a vertical axis, for example to provide front wheel drive.

Figure 28:
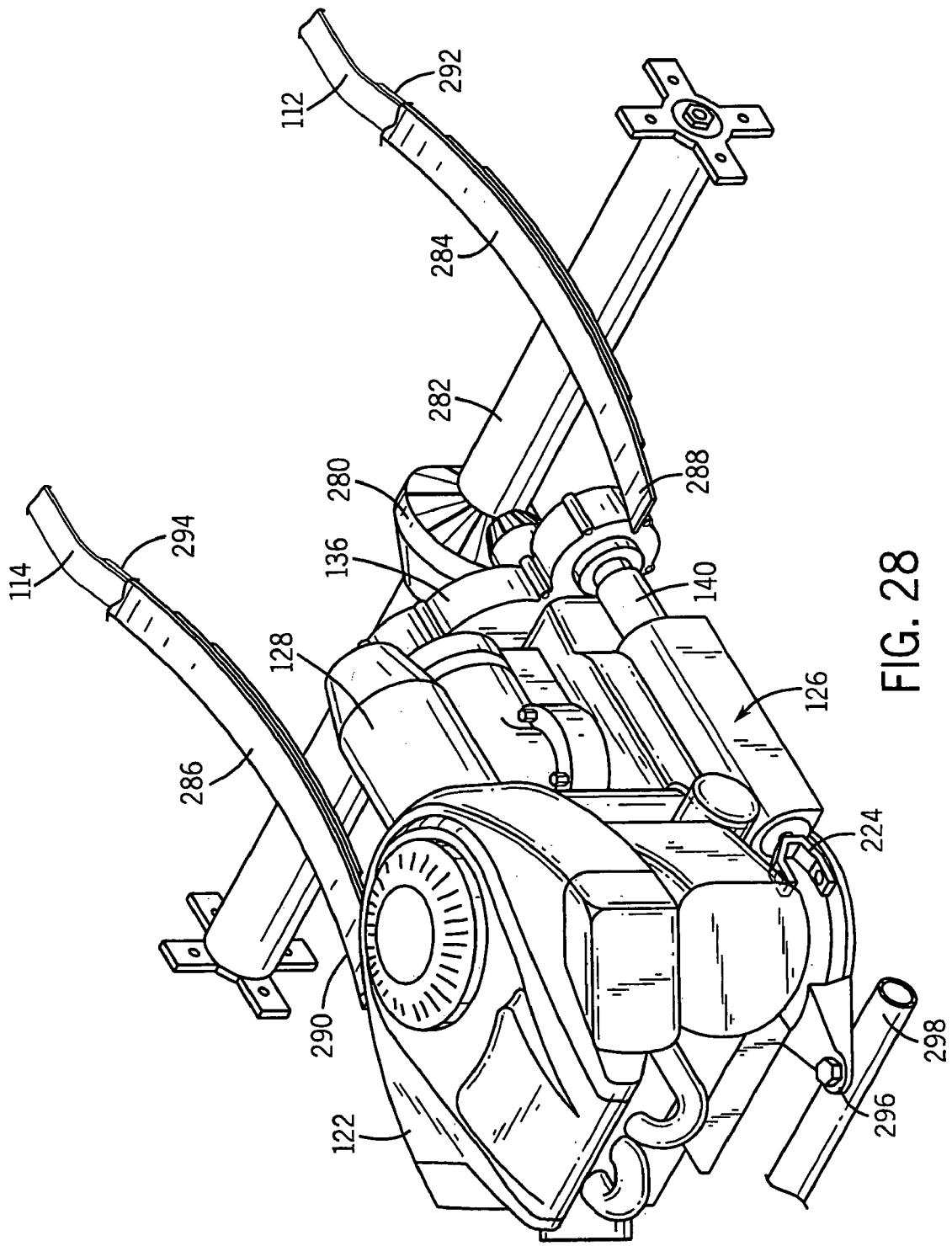
FIG. 28 is an isometric view like FIG. 12 and shows a further embodiment.

FIG. 28 shows a further embodiment and uses like reference numerals from above where appropriate to facilitate understanding. The output of second transmission 128 drives a differential 280 propelling the vehicle at rear wheels 18, 20. Differential 280 is aft of transmission 128 and is on a rear axle 282 sprung by a pair of leaf springs 284, 286. Engine 122, first and second transmissions 126 and 128 and power transfer device 136 form the noted modular unit. Leaf springs 284, 286 have forward ends 288, 290, respectively, mounted to such modular unit, and rearward ends 292, 294, respectively, mounted to the vehicle at frame rails 112, 114, respectively. The modular unit has a forward portion 296 mounted to the vehicle such as at cross-over bar 298 connected to frame rails 112, 114 and extending laterally therebetween. This provides a three-point mounting system consisting of the noted forward ends 288, 290 of the leaf springs and forward portion 296 of the modular unit. The combination of items 122, 126, 128, 136, 280, 282, 284, 286 forms a further unit mountable as a self-contained module to the vehicle.

Figure 29:
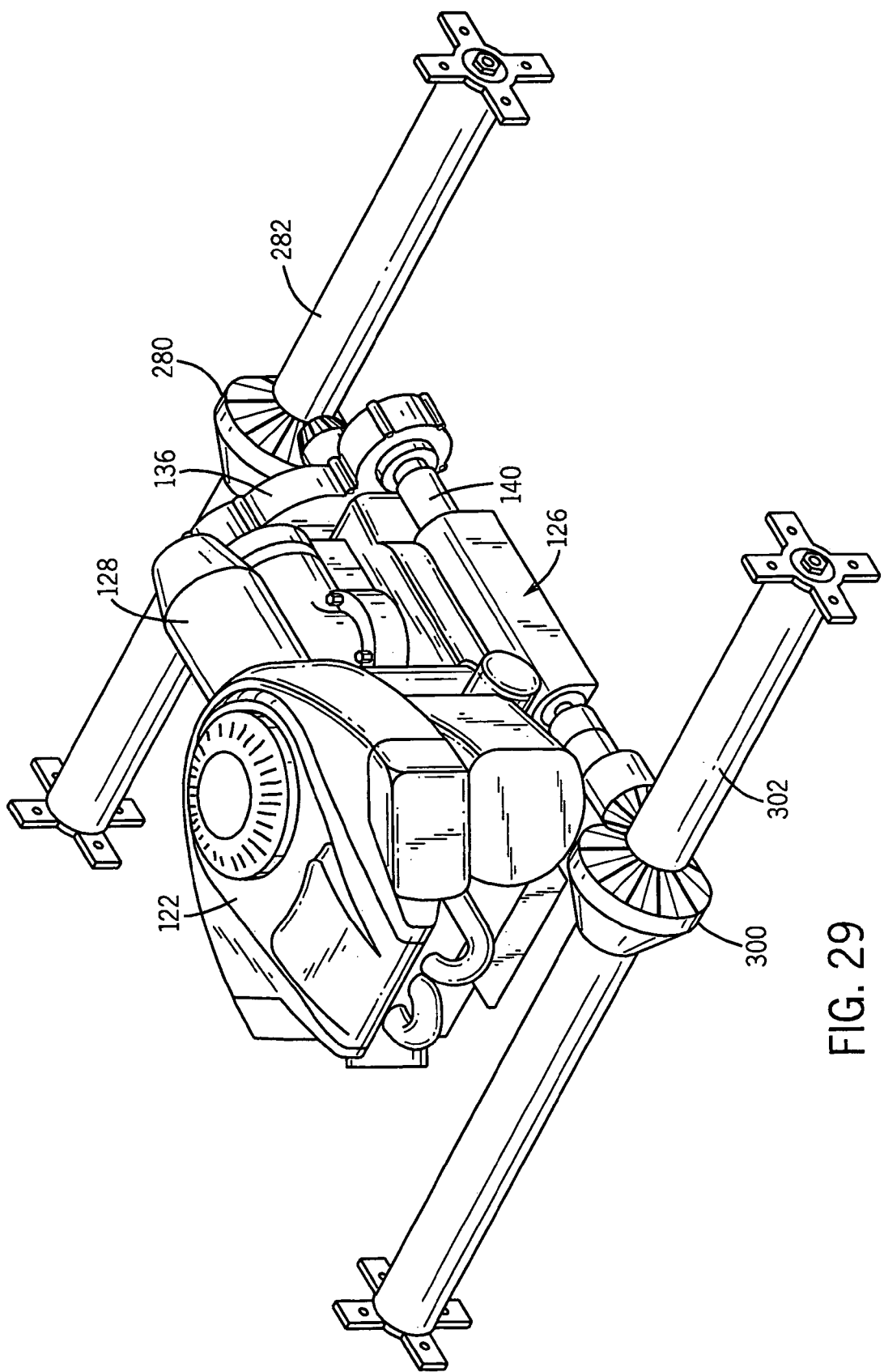
FIG. 29 is an isometric view like FIG. 12 and shows a further embodiment.

FIG. 29 shows a further embodiment and uses like reference numerals from above where appropriate to facilitate understanding. The output of second transmission 128 also drives via shaft 140 a second differential 300 propelling the vehicle. Second differential 300 is forward of transmission 128 and is on front axle 302 and drives front wheels 14, 16. Engine 122, first and second transmissions 126 and 128 and power transfer device 136 form the noted modular unit, which modular unit is between first and second differentials 280 and 300 and supported thereby. The combination of items 122, 126, 128, 136, 280, 282, 140, 300, 302 forms a unit mountable as a self-contained module to the vehicle.

The disclosed system provides a vehicle drivetrain 110, FIG. 12, including an engine 122 having a PTO shaft 124, FIG. 14, extending downwardly and vertically, a first transmission 126, FIG. 13, below the engine and driven by the PTO shaft, and a second transmission 128 above the first transmission and horizontally adjacent the engine. The second transmission 128 is a 90° transmission having an input shaft 130 extending downwardly and vertically and driven by the first transmission, and having an output shaft 132 extending horizontally. The drivetrain propels the vehicle 10 in a propulsion direction (leftwardly in FIG. 1) along a longitudinal axis of the vehicle. Each of the PTO shaft 124 and the input shaft 130 of second transmission 128 is perpendicular to such longitudinal axis. Output shaft 132 of second transmission 128 is parallel to such longitudinal axis.

Mounting case 148 mounts all three of engine 110 and first and second transmissions 126 and 128 thereto. Mounting case 148 has an upper surface 134. Engine 122 is mounted to upper surface 134 of the mounting case and extends upwardly therefrom. Second transmission 128 is mounted to upper surface 134 of the mounting case and extends upwardly therefrom. First transmission 126 is below upper surface 134 and is mounted solely in depending relation therefrom without mounting support from below. Mounting case 148, engine 122, and first and second transmissions 126 and 128 form in combination a modular pre-assembled unit ready for drop-in mounting to the vehicle. Engine 122 and second transmission 128 are each mounted to mounting case 148 at respective first and second mounting attachments 150 and 152 precisely spaced and aligned and providing precise spacing of the centerlines of the PTO shaft 124 and the input shaft 130 of second transmission 128 and precise alignment of such shafts 124, 130 in parallelism.

Figure 22:
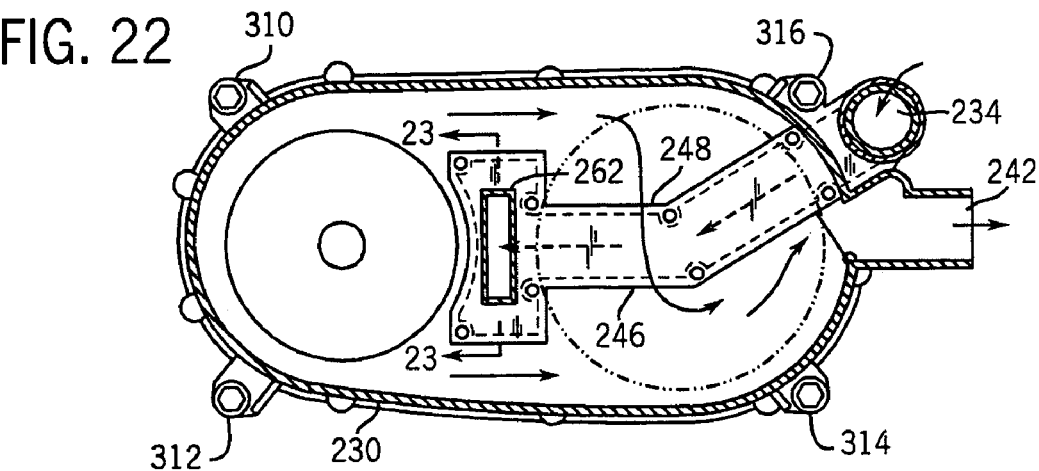
FIG. 22 is a top view partially in section of the construction of FIG. 21 and is taken along line 22-22 of FIG. 25.
Figure 23:
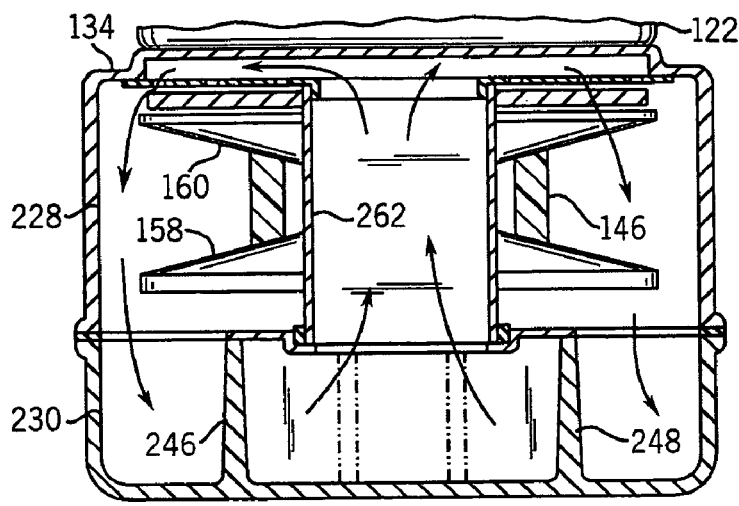
FIG. 23 is a sectional view taken along lines 23-23 of FIGS. 22 and 25.

Mounting case 148 has at least one and preferably a plurality of first mounting surfaces 310, 312, 314, 316, FIGS. 13, 22, mounted to the vehicle, e.g. to a respective frame rail 112, 114 at a respective shock and vibration absorbing pad 116, FIG. 24, on a respective frame rail flange 118 and secured by respective bolt 120 and nut 318. Mounting case 148 has a second mounting surface at 150, FIG. 13, mounted to the engine, and has a third mounting surface at 152 mounted to second transmission 128. Mounting case 148 is supported on the vehicle at the noted plurality of first mounting surfaces 310, 312, 314, 316. Engine 122 is supported on mounting case 148 at second mounting surface 150. Second transmission 128 is supported on mounting case 148 at third mounting surface 152. Preferably, each of the noted first mounting surfaces 310, 312, 314, 316 is below each of the noted second and third mounting surfaces 150 and 152. Upper surface 134 of the mounting case provides the noted second and third mounting surfaces 150 and 152. PTO shaft 124 penetrates upper surface 134 at second mounting surface 150 and extends into mounting case 148. In one embodiment, mounting case 148 includes the noted upper clamshell portion 228 closed by the noted lower clamshell portion 230. Upper clamshell portion 228 provides the noted upper surface 134. PTO shaft 124 penetrates only the upper clamshell portion 228 and not the lower clamshell portion 230. In another embodiment, as above noted, lower clamshell portion 230 is omitted, and the mounting case 148 includes only the upper clamshell portion 228 having an open bottom end, in which embodiment the upper clamshell portion 228 provides the noted upper surface 134, and PTO shaft 124 penetrates upper clamshell portion 228. In each embodiment, PTO shaft 124 extends downwardly into the mounting case to a lower end 320, FIG. 15. Each of the noted mounting surfaces 310, 312, 314, 316 is below lower end 320 of PTO shaft 124.

It is recognized that various equivalents, alternatives and modifications are possible within the scope of the appended claims which distinctly define the subject matter regarded as the invention.

What is claimed is:

1. A vehicle drivetrain comprising:
   an engine having a PTO, power take-off, shaft extending downwardly and vertically;
   a first transmission below said engine and driven by said PTO shaft; and
   a second transmission above said first transmission and horizontally adjacent said engine, said second transmission being a 90° transmission having an input shaft extending downwardly and vertically and driven by said first transmission, and having an output shaft extending horizontally;
   a power transfer device for power to propel the vehicle, the device driven by said output shaft of the second transmission and having first and second drive shafts housed within a transfer case mounted to at least one of the first transmission and the second transmission, at least one of said first and second drive shafts providing vehicle propulsion;
   wherein said output shaft of the second transmission is aft of the vertically and downwardly extending vertical input shaft and parallel to a direction of vehicle propulsion;
   wherein the first and the second driveshafts are mounted to the transfer case in journaled relation therewith and the second driveshaft is additionally mounted to CVT mounting case in journaled relation therewith.

2. The vehicle drivetrain according to claim 1 wherein:
   said drivetrain propels the vehicle in a propulsion direction along a longitudinal axis of the vehicle;
   each of said PTO shaft and said input shaft of said second transmission is perpendicular to said longitudinal axis.

3. The vehicle drivetrain according to claim 2 wherein:
   said output shaft of said second transmission is perpendicular to each of said PTO shaft and said input shaft of said second transmission;
   said output shaft of said second transmission is parallel to said longitudinal axis.

4. The vehicle drivetrain according to claim 1 comprising a mounting case mounting all three of said engine and said first and second transmissions thereto.

5. The vehicle drivetrain according to claim 4 wherein:
   said mounting case has an upper surface;
   said engine is mounted to said upper surface of said mounting case and extends upwardly therefrom;
   said second transmission is mounted to said upper surface of said mounting case and extends upwardly therefrom.

6. The vehicle drivetrain according to claim 5 wherein said first transmission is below said upper surface of said mounting case and is mounted solely in depending relation therefrom without mounting support from below.

7. The vehicle drivetrain according to claim 4 wherein said mounting case, said engine, and said first and second transmissions comprise in combination a modular pre-assembled unit ready for drop-in mounting to the vehicle.

8. The vehicle drivetrain according to claim 7 wherein said engine and said second transmission are each mounted to said mounting case at respective first and second mounting attachments precisely spaced and aligned and providing precise spacing of the centerlines of said PTO shaft and said input shaft of said second transmission and precise alignment of such shafts in parallelism.

9. The vehicle drivetrain according to claim 1 comprising a mounting case having at least one first mounting surface mounted to the vehicle, a second mounting surface mounted to said engine, and a third mounting surface mounted to said second transmission,
    said mounting case being supported on the vehicle at said first mounting surface,
    said engine being supported on said mounting case at said second mounting surface,
    said second transmission being supported on said mounting case at said third mounting surface.

10. The vehicle drivetrain according to claim 9 wherein said first mounting surface is below each of said second and third mounting surfaces.

11. The vehicle drivetrain according to claim 10 wherein:
    said mounting case has an upper surface providing said second and third mounting surfaces;
    said PTO shaft penetrates said upper surface at said second mounting location and extends into said mounting case.

12. The vehicle drivetrain according to claim 11 wherein:
    said mounting case comprises an upper clamshell portion closed by a lower clamshell portion;
    said upper clamshell portion provides said tipper surface;
    said PTO shaft penetrates only said upper clamshell portion and not said lower clamshell portion.

13. The vehicle drivetrain according to claim 11 wherein:
    said mounting case comprises an upper clamshell portion having an open bottom end;
    said upper clamshell portion provides said upper surface;
    said PTO shaft penetrates said upper clamshell portion.

14. The vehicle drivetrain according to claim 1 comprising a mounting case having a mounting surface mounted to the vehicle, wherein:
    said PTO shaft extends downwardly into said mounting case to a lower end;
    said mounting surface is below said lower end of said PTO shaft.

15. The vehicle drivetrain of claim 1, wherein the power transfer device is a power transfer rotary drive member driven by said output shaft of said second transmission to transfer power to propel the vehicle.

16. The vehicle drivetrain of claim 1, wherein said first and second driveshafis are driven in torque balancing counter-rotation for providing vehicle propulsion.

17. A vehicle drivetrain comprising:
    an engine having a PTO, power take-off, shaft extending downwardly and vertically;
    a first transmission below said engine and driven by said PTO shaft; and
    a second transmission above said first transmission and horizontally adjacent said engine, said second transmission being a 90° transmission having an input shaft extending downwardly and vertically and driven by said first transmission, and having an output shaft extending horizontally;
    a power transfer device for power to propel the vehicle, the device driven by said output shaft of the second transmission and having first and second drive shafts housed within a transfer case mounted to at least one of the first transmission and the second transmission, at least one of said first and second drive shafts providing vehicle propulsion;
    wherein said output shaft of the second transmission is aft of the vertically and downwardly extending vertical input shaft and parallel to a direction of vehicle propulsion;
    wherein the first transmission is a constant velocity clutch continuously variable transmission (CVT), said first transmission having a first pulley driven by said PTO shaft, a second pulley driving said input shaft of said second transmission and a belt extending from said first pulley to said second pulley.

18. The vehicle drivetrain of claim 17, wherein the first and the second pulleys rotate in a horizontal plane.

* * * * *